(12) United States Patent
Leung

(10) Patent No.: US 6,501,746 B1
(45) Date of Patent: Dec. 31, 2002

(54) MOBILE IP DYNAMIC HOME ADDRESS RESOLUTION

(75) Inventor: Kent K. Leung, Mountain View, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/227,397

(22) Filed: Jan. 8, 1999

(51) Int. Cl.$^7$ .............................................. H04Q 7/24
(52) U.S. Cl. ........................ 370/338; 370/401; 370/901
(58) Field of Search ................................ 370/389, 392, 370/400, 401, 338, 466; 455/433, 432, 435, 431

(56) References Cited

U.S. PATENT DOCUMENTS

| | | | |
|---|---|---|---|
| 4,692,918 A | | 9/1987 | Elliott et al. .................... 370/85 |
| 5,016,244 A | | 5/1991 | Massey et al. .................. 370/16 |
| 5,018,133 A | | 5/1991 | Tsukakoshi et al. ... 340/825.05 |
| 5,159,592 A | * | 10/1992 | Perkins ......................... 370/401 |
| 5,218,600 A | | 6/1993 | Schenkyr et al. .............. 370/16 |
| 5,371,852 A | | 12/1994 | Attanasio et al. ........... 395/200 |
| 5,442,633 A | * | 8/1995 | Perkins et al. ............... 370/392 |
| 5,457,736 A | * | 10/1995 | Cain et al. .................... 370/389 |
| 5,473,599 A | | 12/1995 | Li et al. ......................... 370/16 |
| 5,572,528 A | * | 11/1996 | Shuen ........................... 455/432 |
| 5,659,544 A | * | 8/1997 | La Porta et al. ............. 370/389 |
| 5,793,762 A | * | 8/1998 | Penners et al. .............. 370/389 |
| 5,901,352 A | * | 5/1999 | St-Pierre et al. ............. 455/433 |
| 6,137,791 A | * | 10/2000 | Frid et al. .................... 455/435 |
| 6,144,671 A | * | 11/2000 | Perinpanathan et al. .... 370/400 |
| 6,160,804 A | * | 12/2000 | Ahmed et al. ............... 370/392 |

OTHER PUBLICATIONS

Release notes for 3Com Corporation, "Conducting a Redundant Route for Network Resiliency," Mar. 1994, *NET Builder Family Bridge/Router* pp. 26–29.

J. Moy, RFC 1247 "OSPF Version 2," Jul. 19, 1991.
D. Oran, RFC 1142 "OSI IS–IS Intra–domain Routing Protocol," Feb. 1990.
Uyless Black, "TCP/IP and Related Protocols," 1992, *McGraw–Hill, Inc.*, pp. 226–249.
T. Li, et al., RFC 2281 "Cisco Hot Standby Router Protocol (HSRP)," Mar. 1998.

(List continued on next page.)

Primary Examiner—Steven Nguyen
Assistant Examiner—Phuongchau Ba Nguyen
(74) Attorney, Agent, or Firm—Beyer Weaver & Thomas LLP

(57) ABSTRACT

Methods and apparatus for assigning an IP address to a mobile node during registration are disclosed. According to one aspect, a registration request is sent by a mobile node. A mobile node ID associated with the mobile node is obtained. A registration request packet is then composed. The registration request packet stores at least a portion of the mobile node ID in the registration request packet. The registration request packet is sent to a Home Agent associated with the mobile node. According to another aspect, a registration request packet is processed by a Home Agent. The Home Agent receives the registration request packet and ascertains whether the mobile node designated by the registration request packet needs an IP address. An IP address is assigned to the mobile node if it is ascertained that the mobile node needs an IP address. A registration reply specifying the IP address assigned to the mobile node is then composed. According to another aspect, a registration reply packet received by a Foreign Agent is processed. The registration reply packet is received from a Home Agent. The registration reply packet specifies a portion of a mobile node ID and an IP address associated with a mobile node. The portion of the mobile node ID and the IP address are obtained from the registration reply packet. A visitor table is updated with a mapping of the mobile node ID to the IP address. The registration reply packet is sent to the mobile node.

46 Claims, 14 Drawing Sheets

OTHER PUBLICATIONS

Chambless, et al., "Home Agent Redundancy Protocol (HARP)," Oct. 27, 1997.

Network Working Group, RFC 2002 "IP Mobility Support," Oct. 1996.

C. Perkins, "*IP Mobility Support*," RFC2002, IBM Corporation, Oct. 1996.

"*Mobile IP*," Release 12.0(1)T, pp. 1–55.

Montenegro, G., "*Reverse Tunneling for Mobile IP*," RFC 2344, Sun Microsystems, Inc., pp. 1–19, May 1998.

D. Harkins and D. Carrel, "*The Internet Key Exchange (IKE)*," Cisco Systems, pp. 1–33, Jun. 1998.

D. Cong and M. Hamlen, and C. Perkins, "*The Definitions of Managed Objects for IP Mobility Support using SMIv2*," RFC2006, Motorola and IBM, pp. 1–52, Oct. 1996.

* cited by examiner

MOBILE IP DYNAMIC HOME ADDRESS RESOLUTION

BACKGROUND OF THE INVENTION

1. Field of the Invention

The present invention relates to Mobile IP network technology. More particularly, the present invention relates to Mobile IP dynamic home address assignment.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10.

Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. An output message from the Mobile Node is then packetized and forwarded through Foreign Agent 10 over the internet 4 and to corresponding node 18 (as indicated by the dotted line "packet from MN") according to a standard internet protocol. If corresponding node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

In today's rapidly expanding economy, many businesses are increasing their work force considerably. With this expansion, these businesses may wish to provide most or all of these employees with access to the internet. At the same time, such businesses typically have a limited number of IP addresses for use by these employees. Therefore, it may be impossible to permanently assign an IP address to some or all of the mobile nodes used by these employees.

Although a business may not be able to permanently assign a unique IP address to each mobile node, each mobile node roaming to a Foreign Agent must be able to receive packets from corresponding nodes. As described above, the mobile node's IP address (i.e., Home Address) is typically used to identify the mobile node. Thus, when messages are sent to a mobile node, they are sent to that mobile node's IP address. In view of the above, it would be desirable if an IP address could be assigned temporarily to a mobile node on an as-needed basis.

SUMMARY OF THE INVENTION

The present invention provides methods and apparatus for assigning an IP address to a mobile node during registration.

This may be accomplished by mapping a mobile node ID associated with the mobile node to the assigned IP address. In this manner, the mobile node may be properly identified during registration and the mobile node may use the assigned IP address upon completion of registration.

According to one aspect of the invention, a method of sending a registration request in a mobile node is provided. A mobile node ID associated with the mobile node is obtained. A registration request packet is then composed. The registration request packet stores at least a portion of the mobile node ID in the registration request packet. The registration request packet is then sent to a Home Agent associated with the mobile node.

According to another aspect of the invention, a method of processing a registration request packet received by a Home Agent from a mobile node is provided. The registration request packet is received from a mobile node. It is then ascertained whether the mobile node designated by the registration request packet needs an IP address. An IP address is then assigned to the mobile node if it is ascertained that the mobile node needs an IP address. A registration reply specifying the IP address assigned to the mobile node is then composed.

According to yet another aspect of the invention, a method of processing a registration reply packet received by a Foreign Agent from a Home Agent is disclosed. The registration reply packet is received from the Home Agent. The registration reply packet specifies at least a portion of a mobile node ID and an IP address associated with a mobile node. The portion of the mobile node ID and the IP address are then obtained from the registration reply packet. A visitor table is then updated with a mapping of the mobile node ID to the IP address associated with the mobile node. The registration reply packet is then sent to the mobile node.

The present invention may be used to temporarily assign an IP address to a mobile node on an as-needed basis. In this manner, a pool of IP addresses may be advantageously distributed to preserve the pool of IP addresses. Accordingly, the present invention permits an entity to economically utilize a limited number of IP addresses.

DETAILED DESCRIPTION OF THE INVENTION

Figure 1:
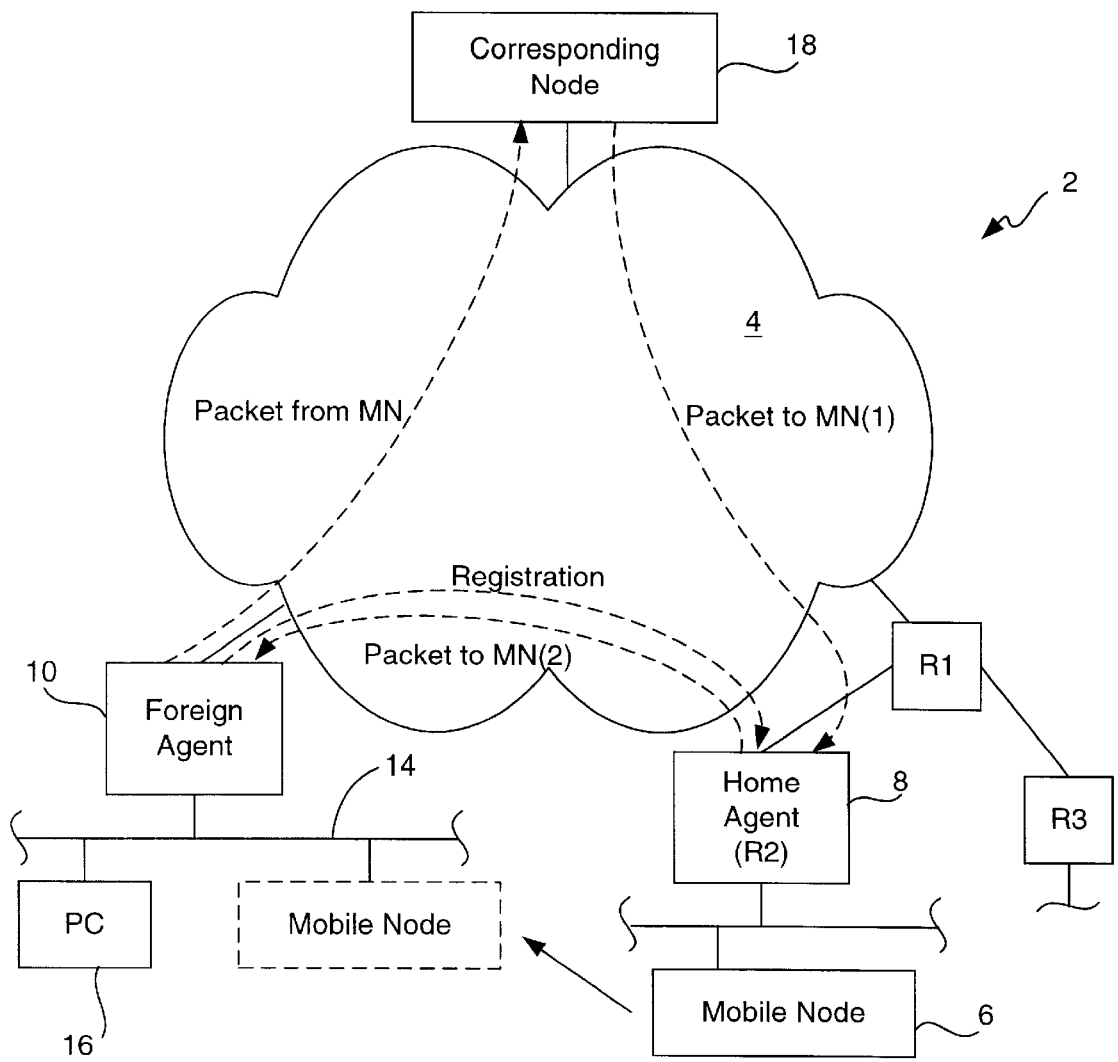
FIG. 1 is a diagram of a Mobile IP network segment and associated environment.

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

An entity (e.g., a business, government, or university) that provides a home network and a Home Agent will typically have a limited number of IP addresses that may be used by the mobile nodes associated with that home network. Since all of the users associated with these mobile nodes will not typically access the internet simultaneously at any given time, it may be desirable to temporarily assign an IP address for use by one or more mobile nodes on an as-needed basis. In this manner, a pool of IP addresses may be advantageously distributed to preserve the pool of IP addresses. Accordingly, the present invention permits an entity to economically utilize a limited number of IP addresses.

An invention is described herein which provides methods and apparatus for assigning an IP address to a mobile node during registration. This may be accomplished by mapping a mobile node ID associated with the mobile node to the assigned IP address. In this manner, the mobile node may be properly identified during the registration phase and the mobile node may use the assigned IP address upon completion of the registration phase.

As described above, not all mobile nodes associated with a Home Agent, or home network, will have IP addresses that may be used for identification purposes. However, each mobile node will typically have a unique mobile node ID such as that used by the manufacturer (e.g., a serial number or MAC address). Such a mobile node ID may therefore be used to identify the mobile node during the registration process until an IP address is assigned to the mobile node. This may be accomplished through storing at least a portion of the mobile node ID in the registration request. Once an IP address is assigned to the mobile node, the IP address may then be transferred to the mobile node in a registration reply composed by the Home Agent. The mobile node ID, or portion thereof, may be similarly transferred in the registration reply to permit a Foreign Agent and the mobile node to map the mobile node ID to the assigned IP address. The mobile node may then use the IP address in subsequent communications with a corresponding node. The IP address may later be de-allocated for use by another mobile node.

The mobile node ID associated with a particular mobile node may have a varying number of bytes. As a result, it may be preferable to store this identifying ID in various locations of the registration request and registration reply depending upon the size of the mobile node ID. Typically, an IP address, or Home Address, associated with a mobile node is provided in a field of the registration request packet and the registration reply packet identified as a "Home Address" field. If the mobile node ID includes a number of bytes that is less than or equal to the size of this field, the mobile node ID may be provided in this Home Address field. However, if the size of the mobile node ID is greater than that of the Home Address field, an extension may be appended to the registration request and the registration reply to allow the mobile node ID to be used as an identifier during the registration process. Alternatively, a portion of the mobile node ID may be provided in the Home Address field if the entire mobile node ID is too large to transfer in a field such as the Home Address field.

As will be described with reference to FIGS. 2 through 11, at least part of the mobile node ID may be provided in the Home Address field of the registration request. In one possible scenario, the size of the mobile node ID may be less than or equal to that of the Home Address field of the registration request. In another, the size of the mobile node ID may be greater than that of the Home Address field of the registration request. However, a portion of the mobile node ID rather than the entire mobile node ID may be provided in the Home Address field in situations where it is probable that this portion is unique. Moreover, since the mobile node ID, or portion of the mobile node ID, is used only during the registration process, it may be unlikely that two identical mobile node portions will be used to register with the same Home Agent at approximately the same instant. Therefore, embodiments described with reference to FIGS. 2-11 may be applied in instances where either a portion or the entire mobile node ID is transferred in the Home Address field of the registration request.

As described above, the mobile node ID may have a number of bytes that is greater than that of the Home Address field of the registration request and reply packets. In such a situation, it may be difficult to determine whether any given portion of the mobile node ID will be unique for all mobile nodes supported by the Home Agent and the Foreign Agent under various circumstances. As a result, it may be undesirable to send only a portion of the mobile node ID as an identifier for the mobile node. Therefore, an extension may be appended to the registration request and the registration reply to store the mobile node ID, as will be described in further detail with reference to FIGS. 12 through 16.

Once the IP address is assigned to the mobile node, the Home Agent may update its mobility binding table with the assigned IP address. The IP address may then be transferred to the mobile node by the Home Agent in a registration reply. By way of example, the IP address may be provided in an extension that is appended to the registration reply. This permits the Foreign Agent receiving the registration reply to update its visitor table. Similarly, upon receiving the registration reply, the mobile node may update its interface table with the assigned IP address. An interface table contains information that is relevant to the interfaces of the mobile node. By way of example, such information may include the IP address of the mobile node, the IP address (source address) of the interface, IP maximum transmission unit (MTU) indicating the number of bytes a packet can contain when being transferred out of an interface, when packets are sent out of an interface, subnet mask specifying the network portion of the IP address, the MAC address, and related counters.

In accordance with a first embodiment, at least a portion of the mobile node ID is provided in the Home Address field of the registration request and reply during the registration phase. In addition, the Home Agent verifies whether the mobile node needs an IP address from an ID indicator provided within the registration request packet. The IP address is appended to the registration reply sent by the Home Agent.

In accordance with a second embodiment, the mobile node ID or portion thereof is similarly provided in the Home Address field. However, the Home Agent verifies whether the mobile node ID needs an IP address from a mobile host table rather than a bit provided within the registration request packet. A mobile host table typically identifies each mobile node that is supported by the mobile node's Home Agent, or home network. As described above, the IP address is appended to the registration reply.

Figure 2:
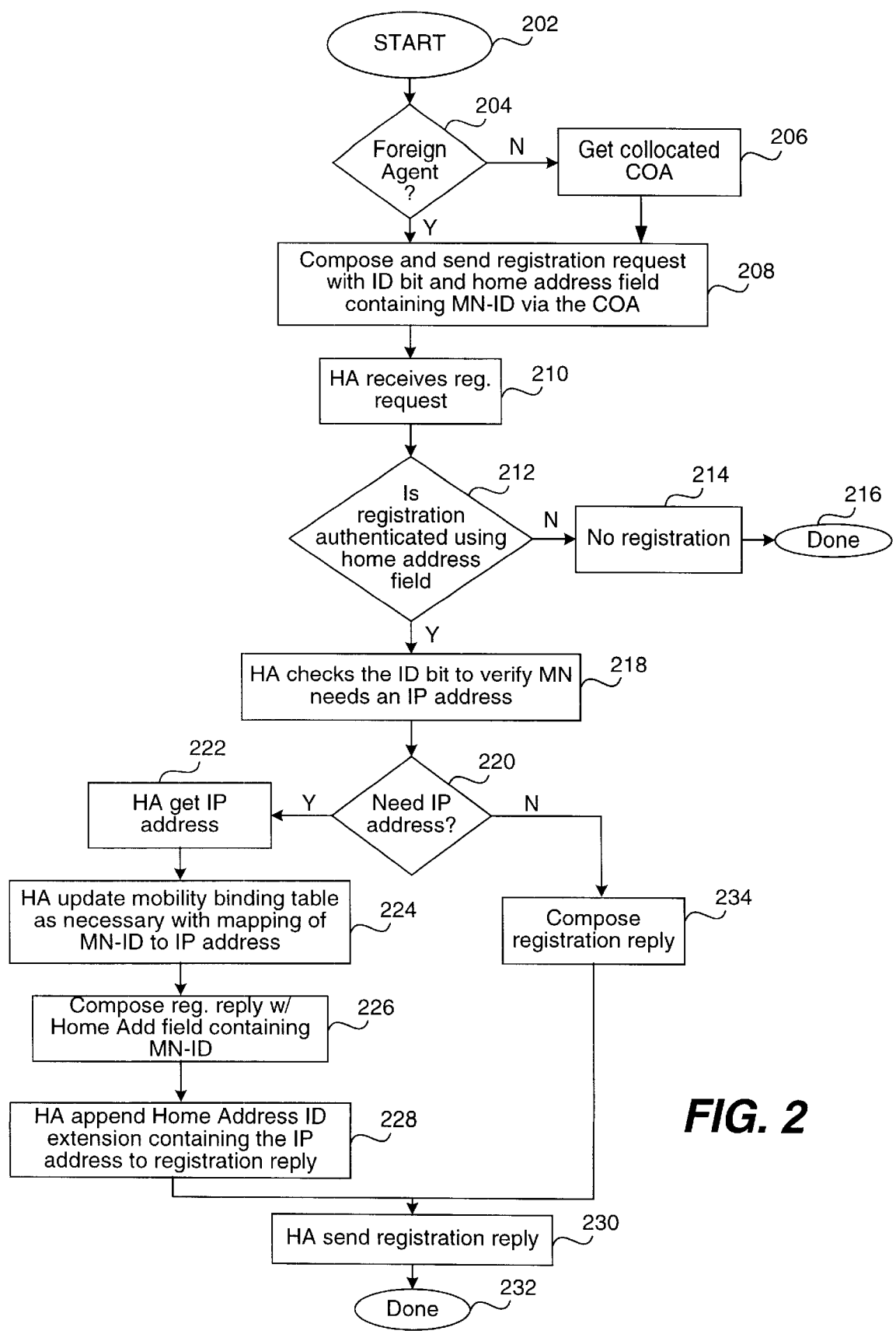
FIG. 2 is a process flow diagram illustrating the steps performed during registration to map a mobile node ID to an IP address according to a first embodiment of the invention.

In accordance with a third embodiment, a mobile node ID that is larger than the Home Address field is provided in an extension to the registration request and a first extension to the registration reply. The Home Agent may determine whether an IP address is needed through the use of an ID indicator or a mobile host table as provided by the first and second embodiments. The IP address is transferred to the mobile node by the Home Agent in a second extension to the registration reply. As described above, it may be desirable to store at least a portion of the mobile node ID in the registration request. By way of example, the mobile node ID or portion thereof may be provided in the Home Address field of the registration request. FIG. 2 is a process flow diagram illustrating the steps performed during registration to map a mobile node ID to an IP address according to a first embodiment of the invention. According to the first embodiment, the registration request may include an ID indicator which indicates when an IP address is needed by the mobile node.

As shown in FIG. 2, the registration process begins at step 202 and at step 204 the process flow diverges depending upon whether the mobile node connects through a foreign agent. If there is no foreign agent, a collocated care-of address is obtained at step 206. A collocated care-of address is an IP address temporarily assigned to an interface of the mobile node itself, or mobile node in this instance. Thus, the care-of address may be an IP address associated with the mobile node. In other words, through the use of a collocated care-of address, packets may be tunneled directly to the mobile node.

Once the care-of address has been obtained, a registration request is composed and sent via the care-of address at step 208. As described above, the mobile node may have a mobile node ID (e.g., serial number) that identifies the mobile node. In order that the mobile node may be identified by data contained in the registration request, at least a portion of the mobile node ID is obtained and provided in the registration request. Typically, the IP address, or Home Address, of the mobile node is provided in a Home Address field of the registration request. In the absence of an IP address, this field may be used to store the mobile node ID or a portion thereof. Thus, assuming that the mobile node ID contains a number of bytes less than or equal to that of the Home Address field, the mobile node ID may be provided in the Home Address field of the registration request packet. Alternatively, a portion of the mobile node ID may be provided in the Home Address field where the size of the mobile node ID is greater than that of the Home Address field. In order to indicate that the mobile node needs an IP address, the registration request may include an ID indicator that may be used for this purpose. By way of example, the ID indicator may include an ID bit which indicates that the mobile node has an IP address when the ID bit is in a first state, and otherwise indicates that the mobile node does not have an IP address. The ID bit may be one of the reserved bits of the registration request packet.

Once composed, the registration request is sent via the care-of address. If there is a foreign agent, the registration request is sent via the foreign agent care-of address. Alternatively, after the collocated care-of address is obtained at step 206, the registration request is composed and sent via the collocated care-of address.

Once the registration request is sent (via Foreign Agent care-of address or collocated care-of address), it is received by the Home Agent associated with the mobile node at step 210. As described above, the registration request comprises a registration request packet that includes at least a portion of the mobile node ID. Next, at step 212, it is determined whether the registration is authenticated by the Home Agent, as provided by RFC 2002 for example. Authentication is typically performed using the Home Address field of the registration request. However, as will be described with reference to FIGS. 12–16A, in the case where the size of the mobile node ID is greater than the Home Address field and a portion of the mobile node ID is not guaranteed to be unique, the mobile node ID may be used for authentication purposes. At step 214, if the registration is not authenticated, the mobile node is not registered with the Home Agent and the process is complete as indicated at step 216.

If the registration is authenticated, registration is completed by the Home Agent in steps 218 through 232. The Home Agent verifies if the mobile node needs an IP address at step 218. According to the first embodiment, the Home Agent checks the ID indicator of the registration request to obtain this information. The process flow then diverges at step 220 depending upon whether the mobile node needs an IP address.

If the Home Agent determines that the mobile node needs an IP address, an IP address is obtained at step 222. The IP address may be obtained from a pool of available IP addresses maintained by the Home Agent or another entity accessible by the Home Agent. The mobility binding table may be checked first to see if the mobile node is reregistering. The Home Agent then updates a mobility binding table as necessary with a mapping of the mobile node ID to the obtained IP address at step 224. As explained in RFC 2002, a mobility binding table is typically used by a Home Agent to maintain a record of the care-of addresses of the mobile nodes that have registered with the Home Agent. Therefore, if a mobile node has previously registered with the Home Agent, the IP address associated with the mobile node may be obtained from such previously created table entries.

After updating the mobility binding table, the home agent composes and sends a Registration Reply to the mobile node, possibly via a foreign agent, to inform the mobile node of the acceptance or rejection of its request. This registration reply is composed and sent in steps 226 through 230. In order to allow a Foreign Agent receiving the registration reply to identify the mobile node, the registration reply includes the identifying portion of the mobile node ID. As described above, the portion or entire mobile node ID may be provided in a Home Address field as shown at step 226. In addition, the registration reply specifies the IP address assigned to the mobile node. By way of example, the Home Agent may append an IP address, or Home Address ID extension containing this IP address to the registration reply at step 228. The Home Agent may then send the registration reply at step 230. The process is completed at step 232.

Alternatively, if an IP address is not required by the mobile node, a registration reply is composed at step 234. This registration reply is then sent by the Home Agent at step 230.

Figure 3:
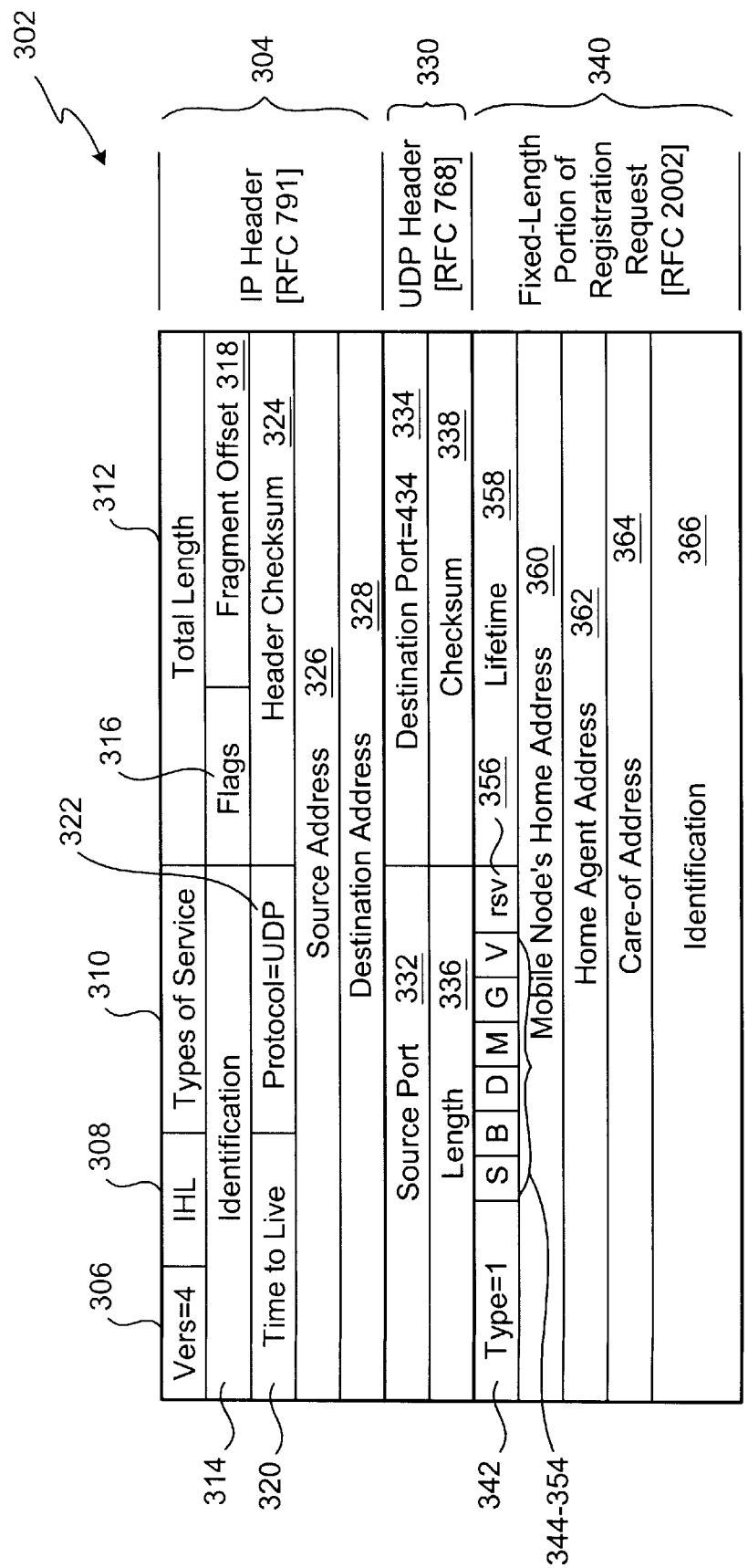
FIG. 3 is a diagram illustrating an exemplary registration request having an ID indicator that may be sent by a mobile node in accordance with an embodiment of the invention.

FIG. 3 is a diagram illustrating an exemplary registration request having an ID indicator that may be sent by a mobile node in accordance with an embodiment of the invention. As shown, a registration request packet 302 includes an IP Header 304 as defined in RFC 791. As is well-known in the field, the IP Header 304 includes a version field 306 which specifies which versions of the Internet Protocol are represented in the registration request packet 302. An Internet Header Length (IHL) field 308 provides the length of the IP header 304. In addition, a Type of Service field 310 is used to specify how the registration request packet 302 is to be handled in networks which offer various service qualities. A Total Length field 312 gives the length of the registration request packet in bytes. In addition, an Identification field 314 is a unique value chosen by the sender to allow a recipient to reassemble a packet that had been separated into fragments. A Flags field 316 and a Fragment Offset field 318 are both to separate an IP registration request packet into fragments to traverse networks that are unable to handle large IP packets. A Time to Live field 320 is used to limit the number of times an individual IP packet may be forwarded. A Protocol field 322 is used by the IP layer to determine which higher layer protocol created the "payload," or data passed down from the higher layer protocol, within the IP packet. A Header Checksum field 324 is used by a receiving node to verify that there was no error in transmission of the IP-header portion of the packet. In addition, the IP Header 304 includes a source address 326 and a destination address 328 of the registration request packet 302.

A UDP Header field 330 is provided by RFC 768. As is well-known in the field, the UDP Header field 330 includes a Source Port field 332, which is selected by the mobile node sending the registration request packet 302. In addition, a mobile node sets Destination Port field 334 to 434, the value reserved for Mobile IP registration messages. UDP Length field 336 provides the size of the UDP Payload (i.e., the Mobile IP fields) measured in bytes. In addition, a Checksum field 338 permits a receiving node to determine if an error occurred in transmission.

The registration request packet 302 further includes a Fixed-Length Portion 340 of the Registration Request which includes the Mobile IP Fields as provided in RFC 2002. As shown, the Fixed-Length Portion 340 includes multiple fields. A Type field 342 identifies the message as either a Registration Request or a Registration Reply. In addition, the mobile node sets an S bit 344 to 1 to ask that its home agent create or delete a binding for the specified care-of address without affecting any other existing bindings.

B, D, M, G, and V bits provide information required for routing of the registration request packet 302. A B bit 346 is set to 1 by a mobile node to request that the home agent provide it a copy of broadcast packets that occur on the home link. A D bit 348 informs the home agent which entity is performing decapsulation. The D bit 348 is set to 1 for a collocated care-of address and is set to 0 for a foreign agent care-of address. An M bit 350 and a G bit 352 request that the home agent use minimal encapsulation [RFC 2004] or generic routing encapsulation [RFC 1701] respectively, instead of IP in IP encapsulation [RFC 2003] for tunneling. A V bit 354 is set to 1 if the mobile node and foreign agent can support Van Jacobson Header Compression [RFC 1144] across the foreign link. In addition, an rsv field 356 typically includes several bits that are reserved for future use.

The remaining fields provide information that may be used during registration of the mobile node. The mobile node sets lifetime field 358 to the number of seconds it would like its registration to last before it expires. In addition, a Mobile Node's Home Address 360 and Home Agent Address 362 are specified. Care-of Address field 364 is set to the specific care-of address being registered or deregistered by the mobile node. In addition, an Identification field 366 is chosen to be unique for each attempted registration. The Identification field 366 permits the mobile node to match Registration Requests with the corresponding Replies. This prevents an outsider from saving a copy of the Registration Request and resending it at a later time.

As described above, the registration request packet may include an ID indicator indicating whether the mobile node has an IP address. The ID indicator may include an ID bit that may be provided in one of the reserved bits 356 as provided in the fixed-length portion of the registration request packet.

Figure 4:
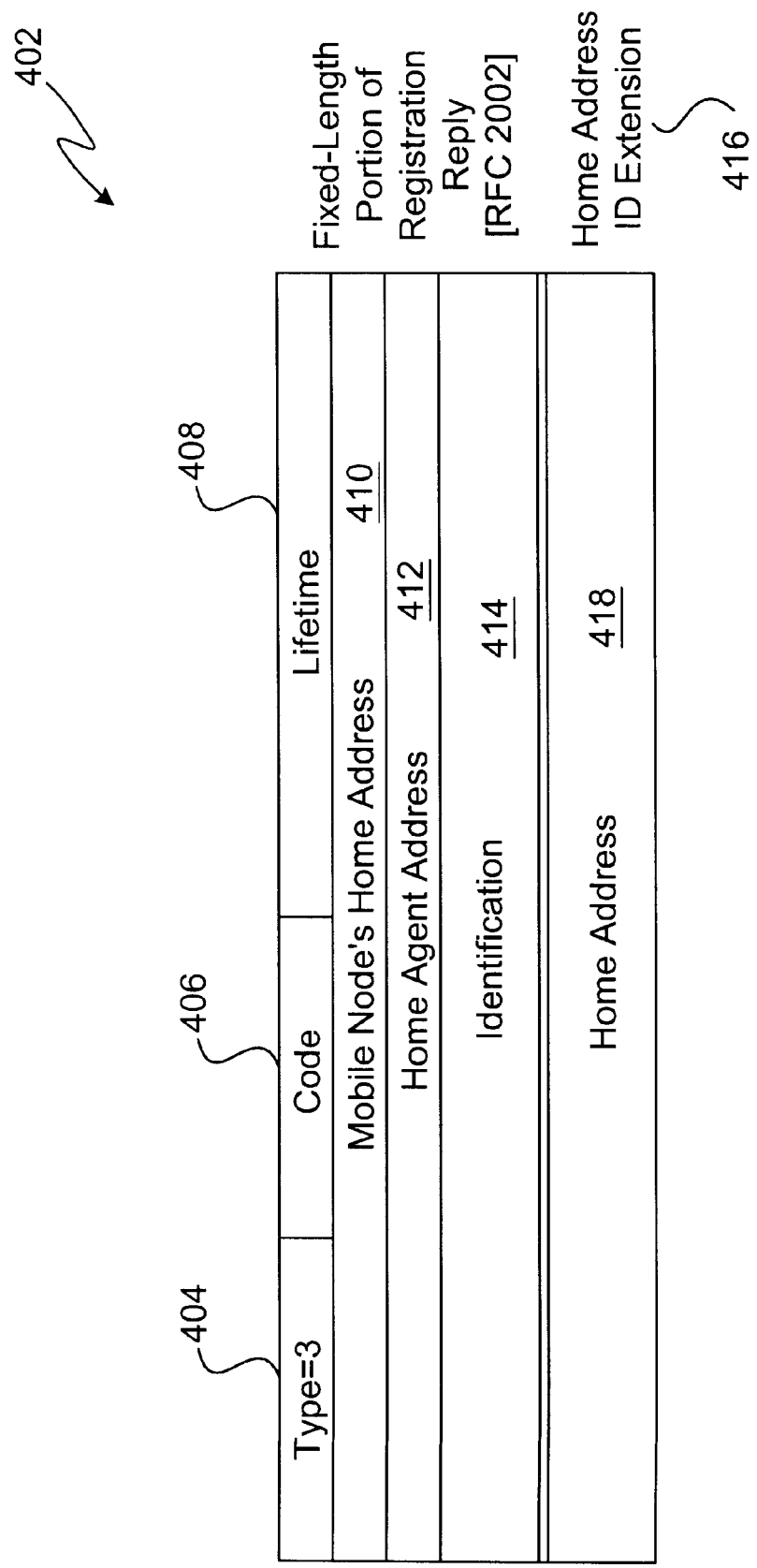
FIG. 4 is a diagram illustrating a registration reply having a Home Address ID extension that may be sent by a Home Agent in accordance with an embodiment of the invention.

FIG. 4 is a diagram illustrating a registration reply having a Home Address ID extension that may be sent by a Home Agent in accordance with an embodiment of the invention. As shown, the fixed length portion 402 of the registration reply includes a Type field 404 that identifies the message as either a Registration Request (1) or a Registration Reply (3). In addition, a Code field 406 tells the mobile node whether its attempted registration was accepted or rejected. A Lifetime field 408 in the registration reply tells the mobile node how long the registration lasts before it expires. In addition, the registration reply includes the mobile node's Home Address 410 and the Home Agent Address 412. The Identification field 414 is chosen by the mobile node to be unique for each registration. This allows the mobile node to match Registration Requests with the corresponding Registration Replies. In addition, this may be used to prevent a third party from capturing the registration request and replaying it at a later time. As described above, the registration reply may include a Home Address ID extension 416 which is capable of storing the IP address, or Home Address 418, that is assigned to the mobile node during registration.

Figures 5, 6, 7:
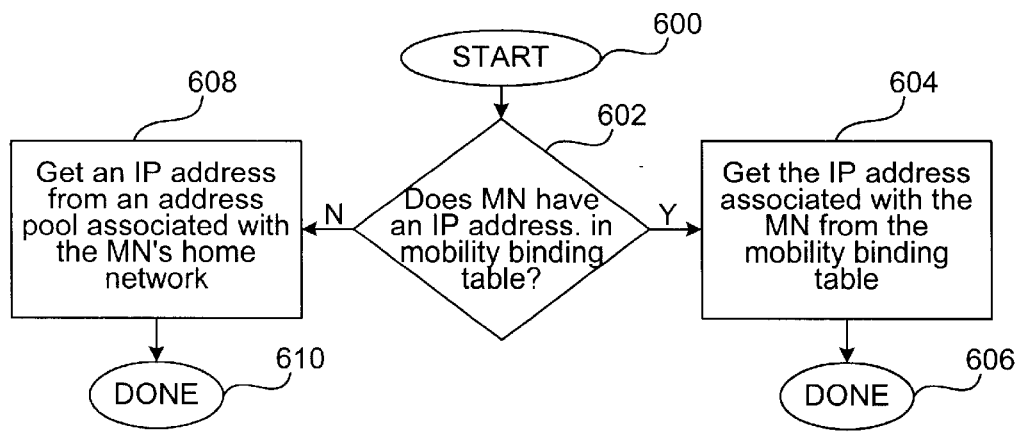
FIG. 5 is a diagram illustrating an exemplary mobility binding table that may be used by an active Home Agent in accordance with an embodiment of the invention.
FIG. 6 is a process flow diagram illustrating the steps performed by the Home Agent during registration to obtain the IP address according to an embodiment of the invention.
FIG. 7 is a diagram illustrating an exemplary mobile host table that may be used by an active Home Agent in accordance with an embodiment of the invention.

As described above, the Home Agent updates its mobility binding table upon receipt of a registration request packet. FIG. 5 is a diagram illustrating an exemplary mobility binding table that may be used by an active Home Agent in accordance with an embodiment of the invention. As described above, a mobility binding table is typically used by a Home Agent to maintain a list of those nodes that have registered with the Home Agent along with their corresponding care-of addresses. Mobility binding tables often associate the IP addresses of these mobile nodes with the care-of addresses upon registration of the mobile nodes. However, according to the present invention, in the instance where a mobile node does not have an IP address, the mobility binding table must also associate the care-of address with the corresponding mobile node ID. As shown, the mobility binding table 502 includes an entry 504 for one or more mobile nodes that have registered with the Home Agent. Each entry 504 includes a mobile node ID 506 associated with one of the mobile nodes and a care-of address 508 associated with the mobile node ID 506. In addition, the entry 504 is shown to include an IP address 510 assigned to the mobile node. In other words, the mobility binding table provides a mapping of mobile nodes that have registered with the Home Agent with their corresponding IP addresses.

As shown in step 222 of FIG. 2, the Home Agent obtains an IP address upon a determination that a mobile node does not have an IP address. FIG. 6 is a process flow diagram illustrating the steps that may be performed by the Home Agent during registration to obtain the IP address according to one embodiment of the invention. The process flow begins at step 600 and at step 602, the Home Agent determines whether the mobile node has an IP address in a mobility binding table such as that illustrated in FIG. 5. As the mobile node roams from foreign agent to foreign agent, it keeps its IP address from its first registration. This will allow the corresponding nodes to continue using the same IP address to communicate with the mobile node during a session. An entry is created or updated in the mobility binding table for each registration. As described above, the mobile node may have previously registered with the Home Agent and may therefore have been previously assigned an IP address. Thus, if an IP address is provided in the mobility binding table, the IP address associated with the mobile node may be obtained from the mobility binding table at step 604 and the process is completed at step 606. However, if the mobile node has not been previously assigned an IP address that may be obtained from the mobility binding table, an IP address is obtained from an address pool associated with the Home Agent, or home network, at step 608. The address pool may be a range of IP addresses configured for allocation to mobile nodes. The process is then completed at step 610.

Since not all mobile nodes will need an IP address, the Home Agent determines whether the mobile node needs an IP address prior to assignment of an IP address. As described above, according to the first embodiment, this is accomplished through the inclusion of an ID indicator in the registration request packet which is checked by the Home Agent upon receipt of the registration request packet. However, according to the second embodiment, the Home Agent may verify whether the mobile node needs an IP address from a mobile host table.

FIG. 7 is a diagram illustrating an exemplary mobile host table that may be used by an active Home Agent in accordance with an embodiment of the invention. As shown, the mobile host table 702 provides a list of mobile nodes that the Home Agent supports such that each of the mobile nodes is associated with a corresponding IP address when actively roaming. The mobile host table 702, as shown, includes an entry 704 for one or more mobile nodes that are supported by the Home Agent. Each of these entries 704 includes a mobile node ID 706 associated with one of the mobile nodes. Such an association may be accomplished by including an IP address 708 associated with the mobile node. By way of example, the IP address 708 may be a configured Home Address or an IP address allocated from the pool of IP addresses.

Figure 8:
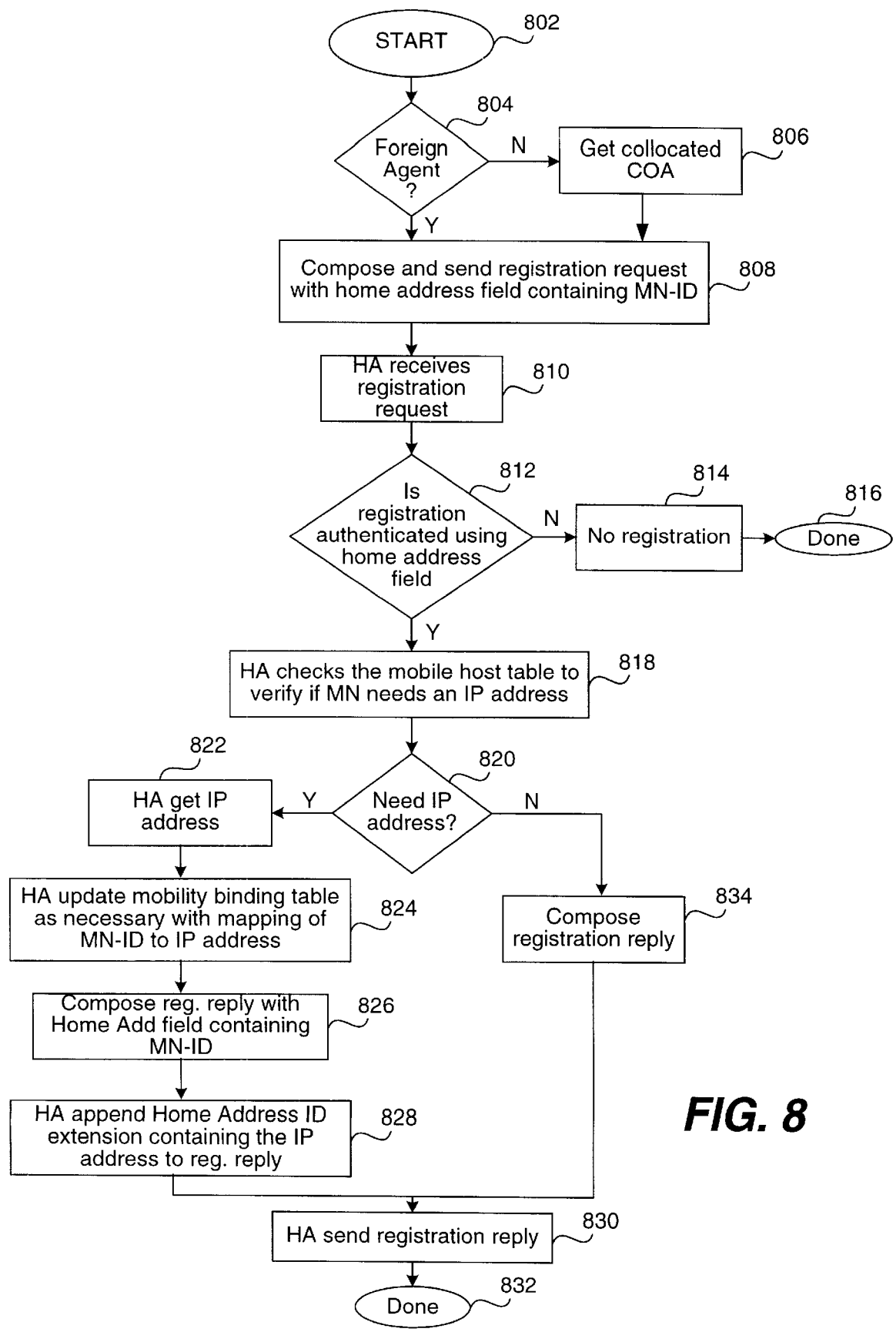
FIG. 8 is a process flow diagram illustrating the steps performed during registration to map a mobile node ID to an IP address according to a second embodiment of the invention.

According to a second embodiment, the Home Agent may determine whether a mobile node needs an IP address by examining a mobile host table such as that illustrated in FIG. 7. Note that this is an alternative to using an ID indicator in the registration request. FIG. 8 is a process flow diagram illustrating the steps performed during registration to map a mobile node ID to an IP address according to the second embodiment of the invention. As shown in FIG. 8, the registration process begins at step 802 and at step 804 the process flow diverges depending upon whether the mobile node connects through a foreign agent. If there is no foreign agent, a collocated care-of address is obtained at step 806.

Once the care-of address has been obtained, a registration request is composed and sent via the care-of address at step 808. As described above, at least a portion of the mobile node ID is obtained and provided in the registration request. Typically, the IP address, or Home Address, of the mobile node is provided in a Home Address field of the registration request. In the absence of an IP address, this field may be used to store the mobile node ID or a portion thereof. Thus, assuming that the mobile node ID contains a number of bytes less than or equal to that of the Home Address field, the mobile node ID may be provided in the Home Address field of the registration request packet. Alternatively, a portion of the mobile node ID may be provided in the Home Address field where the size of the mobile node ID is greater than that of the Home Address field.

Once composed, the registration request is sent via the care-of address. If there is a foreign agent, the registration request is sent via the foreign agent care-of address. Alternatively, after the collocated care-of address is obtained at step 806, the registration request is composed and sent via the collocated care-of address.

Once the registration request is sent (via Foreign Agent care-of address or collocated care-of address), it is received by the Home Agent associated with the mobile node at step 810. As described above, the registration request comprises a registration request packet that includes at least a portion of the mobile node ID. Next, at step 812, it is determined whether the registration is authenticated by the Home Agent, as provided by RFC 2002 for example. Authentication is typically performed using the Home Address field of the registration request. However, as will be described with reference to FIGS. 12–16A, in the case where the size of the mobile node ID is greater than the Home Address field and a portion of the mobile node ID is not guaranteed to be unique, the mobile node ID may be used for authentication purposes. At step 814, if the registration is not authenticated, the mobile node is not registered with the Home Agent and the process is complete as indicated at step 816.

If the registration is authenticated, registration is completed by the Home Agent in steps 818 through 832. The Home Agent verifies if the mobile node needs an IP address at step 818. According to the second embodiment, the Home Agent checks a mobile host table such as that illustrated in FIG. 7 to determine whether the mobile node has an IP address. This may be accomplished by locating the entry corresponding to the specified mobile node in the mobile host table. The process flow then diverges at step 820 depending upon whether the mobile node needs an IP address.

If the Home Agent determines that the mobile node needs an IP address, an IP address is obtained at step 822. The Home Agent then updates a mobility binding table such as that illustrated in FIG. 5 as necessary with a mapping of the mobile node ID to the obtained IP address at step 824. As described above, a mobility binding table is typically used by a Home Agent to maintain a record of the care-of addresses of the mobile nodes that have registered with the Home Agent. Therefore, if a mobile node has previously registered with the Home Agent, the IP address associated with the mobile node may be obtained from such previously created table entries.

The home agent then composes and sends a Registration Reply to the mobile node, possibly via a foreign agent, to inform the mobile node of the acceptance or rejection of its request. This registration reply is composed and sent in steps 826 through 830. In order to allow a Foreign Agent receiving the registration reply to identify the mobile node, the registration reply includes the identifying portion of the mobile node ID. As described above, the portion or entire mobile node ID may be provided in a Home Address field as shown at step 826. In addition, the registration reply specifies the IP address assigned to the mobile node. By way of example, the Home Agent may append an IP address, or Home Address ID extension containing this IP address to the registration reply at step 828. The Home Agent may then send the registration reply at step 830. The process is completed at step 832.

Alternatively, if the mobile node has an IP address, a registration reply is composed at step 834. This registration reply is then sent by the Home Agent at step 830.

Figure 9:
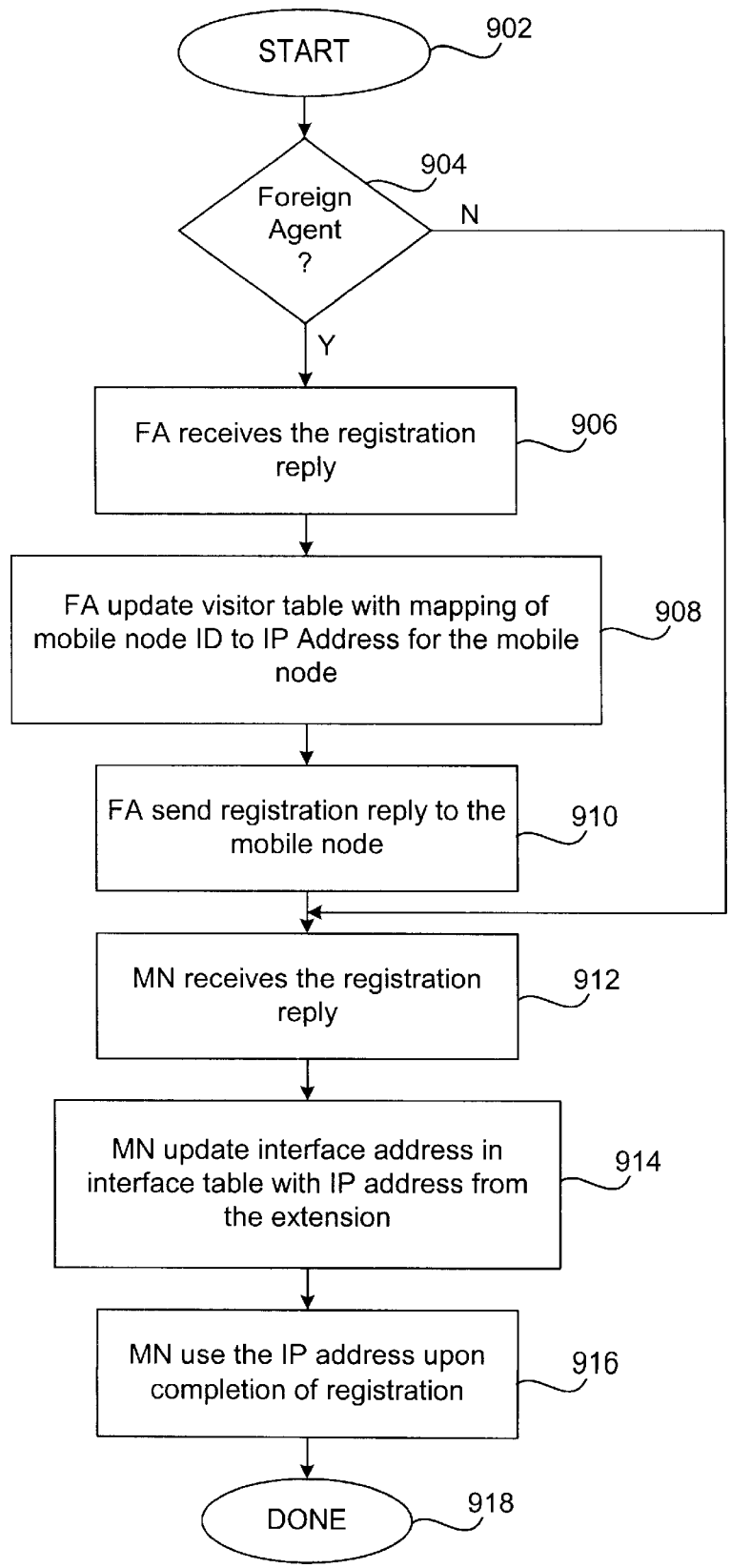
FIG. 9 is a process flow diagram illustrating the steps performed during registration upon receipt of a registration reply containing the IP address and the mobile node ID according to an embodiment of the invention.

FIG. 9 is a process flow diagram illustrating the steps performed during registration upon receipt of a registration reply containing the IP address and the mobile node ID according to an embodiment of the invention. The process begins at step 902 and diverges at step 904 depending upon whether the registration request was sent via a foreign agent or a collocated care-of address. If the request was sent via a foreign agent, the Foreign Agent receives the registration reply packet at step 906. As described above, the registration reply packet specifies at least a portion of a mobile node ID (e.g., provided in the Home Address field or in an extension) and an IP address associated with a mobile node (e.g., provided in an extension). The portion of the mobile node ID and the IP address are obtained from the registration reply packet and a visitor table is updated with a mapping of the mobile node ID to the IP address at step 908. The registration reply packet is then sent to the mobile node at step 910.

The mobile node then receives the registration reply at step 912, either from the foreign agent or directly from the Home Agent. As described above, the registration reply specifies an IP address associated with the mobile node. The mobile node obtains this IP address from the registration reply packet at step 914 and updates an interface table to include the IP address associated with the mobile node such that the mobile node has access to the IP address upon completion of registration of the mobile node. The mobile node may then compose and send packets specifying this IP address to corresponding nodes upon completion of the registration phase at step 916 and the process completes at step 918.

Figure 10:
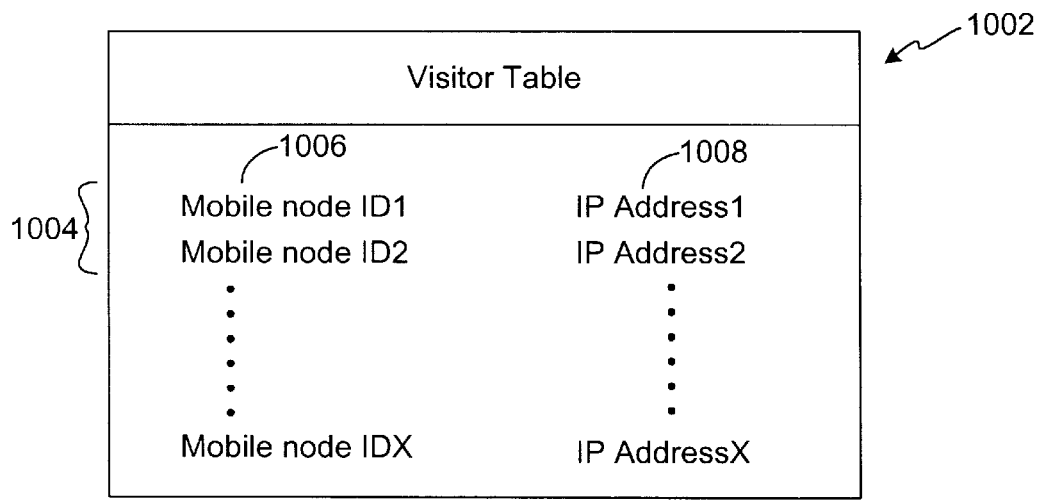
FIG. 10 is an exemplary visitor table that may be used by an active Foreign Agent in accordance with an embodiment of the invention.

As described above with reference to step 908 of FIG. 9, the Foreign Agent updates its visitor table upon receipt of the registration reply. FIG. 10 is an exemplary visitor table that may be used by an active Foreign Agent in accordance with an embodiment of the invention. As shown, the visitor table 1002 has an entry 1004 for one or more mobile nodes that have registered with the Home Agent via the Foreign Agent. Each entry 1004 in the visitor table includes a mobile node ID 1006 associated with one of the mobile nodes and an IP address 1008 associated with the mobile node ID.

Figure 11:
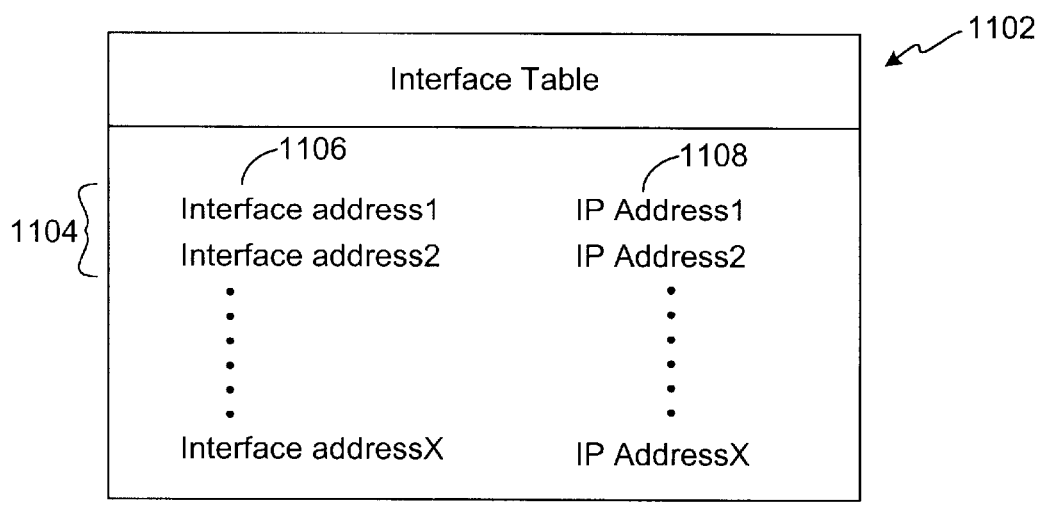
FIG. 11 is an exemplary interface table that may be used by a mobile node in accordance with an embodiment of the invention.

As shown in step 914 of FIG. 9, upon receipt of the registration reply by the mobile node, the mobile node updates its interface table with its assigned IP address. FIG. 11 is an exemplary interface table that may be used by a mobile node in accordance with an embodiment of the invention. As described above, an interface table contains information that is relevant to the interfaces of the mobile node. As shown, an interface table 1102 may include one or more entries 1104 which associate an interface address 1106 with a corresponding IP address 1108.

As described above, the mobile node ID or a portion thereof may be provided in the Home Address field of the registration request and the registration reply packet. However, any given portion of the mobile node ID may not be guaranteed to be unique under various circumstances. Thus, when the size of the mobile node ID is greater than that of the Home Address field (e.g., 4 bytes) of both the registration request and registration reply packets, it may be preferable to provide the mobile node ID in an extension to the registration request and reply packets.

Figure 12:
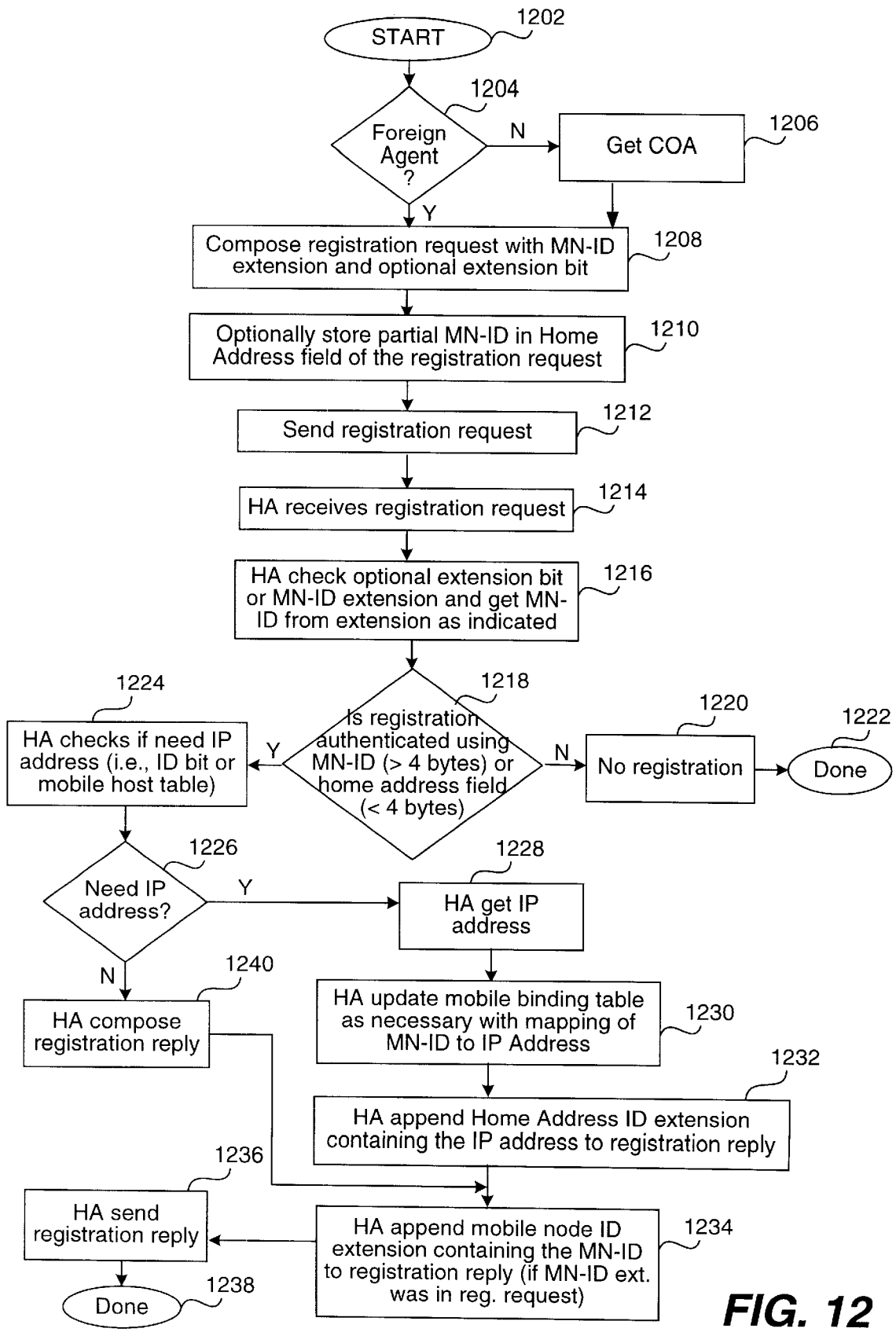
FIG. 12 is a process flow diagram illustrating the steps performed during registration to map a mobile node ID to an IP address according to a third embodiment of the invention.

According to a third embodiment, the mobile node ID is provided in an extension to the registration request packet as well as the registration reply packet. FIG. 12 is a process flow diagram illustrating the steps performed during registration to map a mobile node ID to an IP address according to the third embodiment of the invention. As shown in FIG. 12, the registration process begins at step 1202 and at step 1204 the process flow diverges depending upon whether the mobile node connects through a foreign agent. If there is no foreign agent, a collocated care-of address is obtained at step 1206.

Once the care-of address has been obtained, a registration request is composed at step 1208. According to the third embodiment, the mobile node ID is provided in a mobile node ID extension of the registration request packet. In addition, an extension bit may be provided such that the extension bit is in a first state when the mobile node ID is provided in the extension (e.g., when the mobile node ID has a number of bytes greater than that of the home address field), and otherwise in a second state. By way of example, the extension bit may be provided in one of the reserved bits of the registration request packet. In this manner, the Home Agent may verify upon receipt of the registration request whether the mobile node ID is provided in the Home Address field or an extension.

Authentication of mobile nodes by the Home Agent is typically performed using the Home Address field of the registration request. Thus, a portion of the mobile node ID may be provided in the Home Address field of the registration request for this purpose, compatible with the first and second embodiments. Since this portion is only used during the registration phase, it may be acceptable to assume that this portion will be unique during this brief period of time. Thus, the portion of the mobile node ID may be provided in the Home Address field of the registration request at step 1210. The Home Agent may then authenticate the mobile node using this Home Address field. However, in the case where the size of the mobile node ID is greater than the Home Address field, the mobile node ID may be used for authentication purposes. This may be accomplished through providing the mobile node ID in a mobile node ID extension, which will be described in further detail. Thus, the Home Agent may authenticate mobile nodes using the mobile node ID extension rather than the Home Address field. In this manner, mobile nodes may be guaranteed to be authenticated in accordance with the entire mobile node ID.

Once composed, the registration request is sent via the care-of address at step 1212. If there is a foreign agent, the registration request is sent via the foreign agent care-of address. Alternatively, after the collocated care-of address is obtained at step 206, the registration request is composed and sent via the collocated care-of address.

Once the registration request is sent (via Foreign Agent care-of address or collocated care-of address), it is received by the Home Agent associated with the mobile node at step 1214. As described above, the registration request comprises a registration request packet that includes at least a portion of the mobile node ID. Next, at step 1216, the extension bit may be checked and the mobile node ID may be obtained from the mobile node ID extension as indicated. Alternatively, the mobile node ID extension may be automatically checked to permit the mobile node ID to be obtained as necessary.

Next, at step 1218, it is determined whether the registration is authenticated by the Home Agent. As described above, authentication is typically performed using the Home Address field of the registration request. Alternatively, authentication may be performed using the mobile node ID provided in the mobile node ID extension. Thus, the mobile node and Home Agent may share a security association that is mapped to the mobile node ID that may be obtained from the mobile node ID extension (rather than the Home Address field) to hash the registration request. At step 1220, if the registration is not authenticated, the mobile node is not registered with the Home Agent and the process is complete as indicated at step 1222.

If the registration is authenticated, registration is completed by the Home Agent in steps 1224 through 1240. The Home Agent verifies if the mobile node needs an IP address at step 1224. This may be performed, for example, by checking an ID indicator of the registration request as provided in the first embodiment, or by checking a mobile host table, as provided in the second embodiment. Alternatively, if the registration request includes a mobile node ID extension, it may be implied from the existence of the mobile node ID extension that the mobile node needs an IP address without checking an ID indicator or a mobile host table. The process flow then diverges at step 1226 depending upon whether the mobile node needs an IP address.

If the Home Agent determines that the mobile node needs an IP address, an IP address is obtained at step 1228 such as by the process steps illustrated in FIG. 6. The Home Agent then updates a mobility binding table such as that illustrated in FIG. 5 as necessary with a mapping of the mobile node ID to the obtained IP address at step 1230. As is known in the art, a mobility binding table is typically used by a Home Agent to maintain a record of the care-of addresses of the mobile nodes that have registered with the Home Agent. Therefore, if a mobile node has previously registered with the Home Agent, the IP address associated with the mobile node may be obtained at step 1228 from such previously created table entries.

The home agent then composes and sends a Registration Reply to the mobile node, possibly via a foreign agent, to inform the mobile node of the acceptance or rejection of its request. This registration reply is composed and sent in steps 1232 through 1236. The registration reply specifies the IP address assigned to the mobile node. By way of example, the Home Agent may append an IP address, or Home Address ID extension containing this IP address to the registration reply at step 1232. In order to allow a Foreign Agent receiving the registration reply to identify the mobile node, the registration reply includes the identifying portion of the mobile node ID. According to the third embodiment, a portion of the mobile node ID may be provided in the Home Address field while the entire mobile node ID may be provided in a mobile node ID extension to the registration reply as shown at step 1234 if the mobile node ID extension was provided in the registration request. As described above, this mobile node ID may be obtained from the mobile node ID extension of the registration request packet, which may be indicated by an extension bit. The Home Agent may then send the registration reply at step 1236. The process is completed at step 1238.

Alternatively, if the mobile node already has an IP address, the Home Agent composes a registration reply at step 1240. The Home Agent may then append the mobile node ID extension to the registration reply as shown at step 1234 if the mobile node ID extension was provided in the registration request. By way of example, the extension may be useful to distinguish between two mobile nodes having the same IP address such as where one or both of the IP addresses are local rather than public. This registration reply is then sent by the Home Agent at step 1236 and the process is completed at step 1238.

Once the registration reply is sent to the mobile node, the registration reply is processed according to process steps such as those illustrated in FIG. 9. As shown, the visitor table is updated with a mapping of the mobile node ID to the IP address assigned to the mobile node. However, according to the third embodiment, the mobile node ID may be obtained from the mobile node ID extension rather than the Home Address field as provided by the first and second embodiments.

Figure 13:
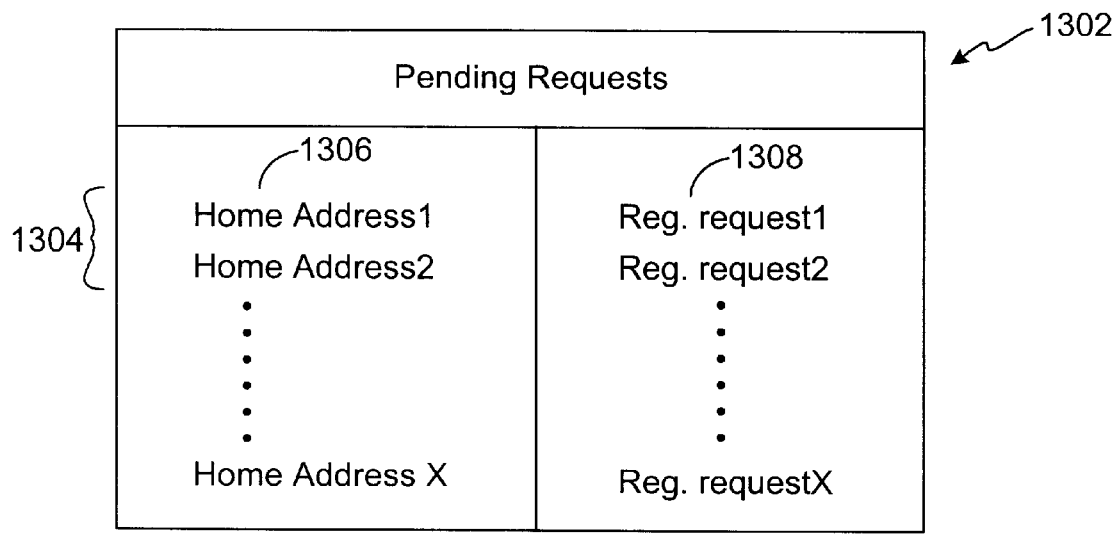
FIG. 13 is an exemplary list of pending requests that is typically maintained by a Foreign Agent during registration.

During the registration phase, Foreign Agents typically maintain a list of pending registration requests. FIG. 13 is an exemplary list of pending requests that is typically maintained by a Foreign Agent during registration. As shown, the Foreign Agent maintains a list of pending registration requests 1302 that includes an entry 1304 for each pending request. Each entry 1304 typically includes a Home Address (i.e., IP address) 1306 of a mobile node such that the Home Address 1306 is associated with one of the pending registration requests 1308. Each registration request may be identified by the Home Address field and the Identification field. When the Foreign Agent receives the registration reply, it typically updates the list of pending registration requests in accordance with the Home Address field of the registration reply. However, such a list may not be ideal since the Home Address field may contain only a portion of the mobile node ID, and may therefore not be unique under all circumstances.

Figure 14:
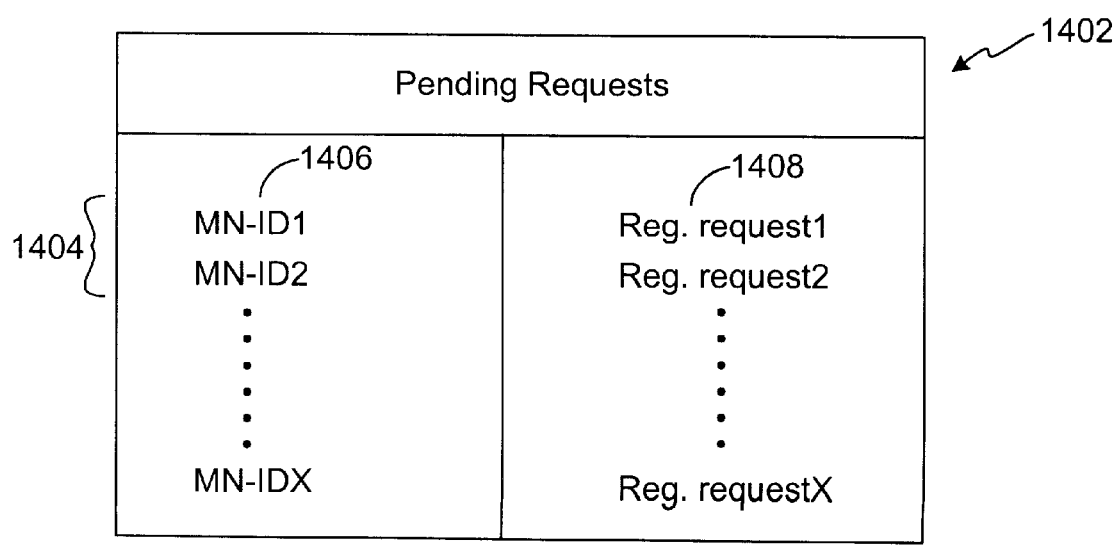
FIG. 14 is an exemplary list of pending requests that may be maintained by a Foreign Agent during registration according to the third embodiment of the invention.

Since the portion of the Home Address that may be provided in the Home Address field of the registration request and reply may not be unique, it may be preferable to track the pending registration requests such that they are indexed according to the entire mobile node ID rather than the Home Address. Thus, in addition to storing the mobile node ID in the visitor table, the Foreign Agent may also use the mobile node ID in its list of pending registration requests. FIG. 14 is an exemplary list of pending requests that may be maintained by a Foreign Agent during registration according to the third embodiment of the invention. As shown, the Foreign Agent may maintain a list of pending registration requests 1402 that includes an entry 1404 for each pending request. Each entry 1404 may include a mobile node ID 1406 such that the mobile node ID 1406 is associated with one of the pending registration requests 1408.

Figure 15:
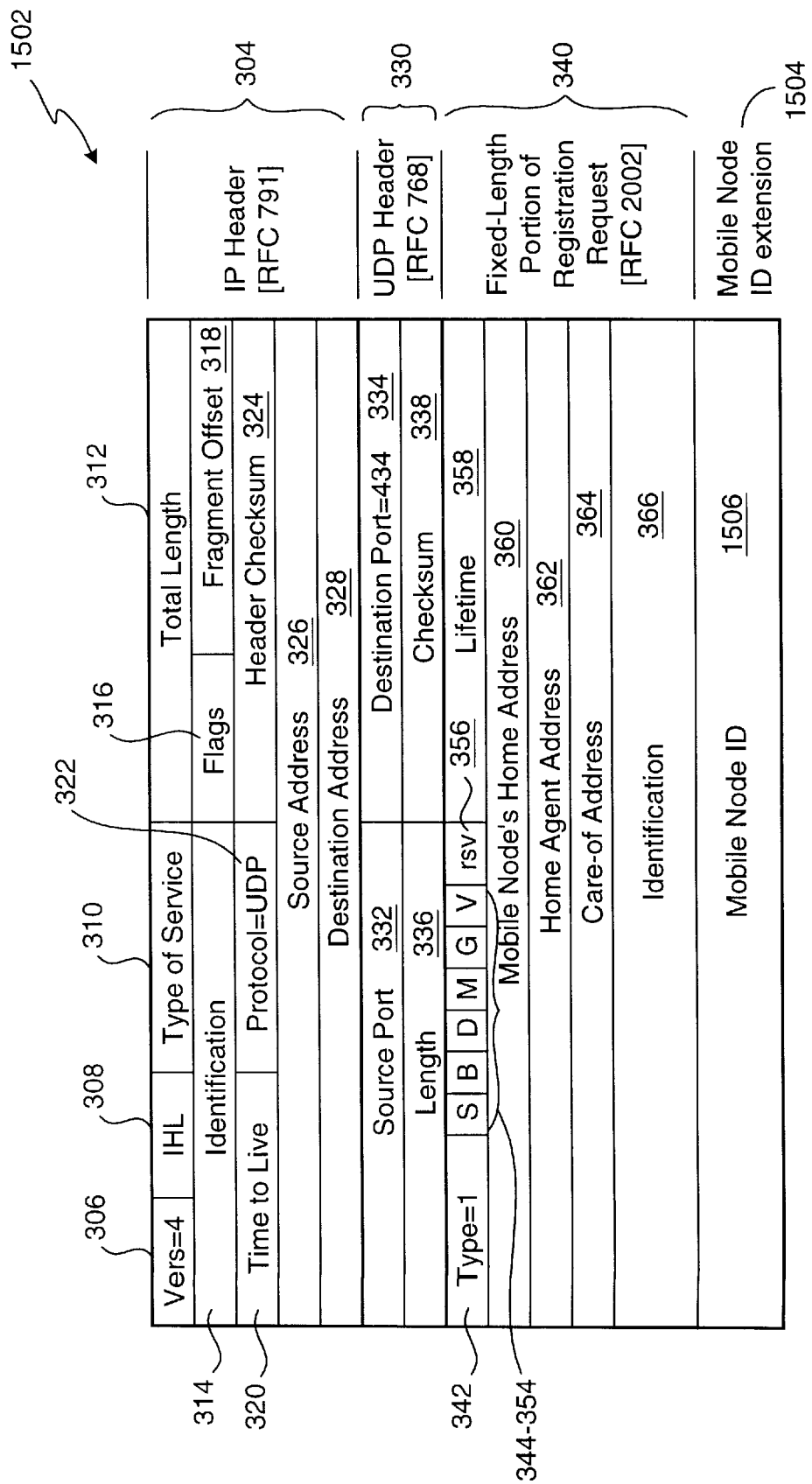
FIG. 15 is an exemplary registration request having a Mobile Node ID extension that may be sent by a mobile node in accordance with the third embodiment of the invention.

As described with reference to the third embodiment, the mobile node ID may be larger than the Home Address field of the registration request. As a result, an extension may be appended to the registration request to store and transfer this mobile node ID to the Home Agent. FIG. 15 is an exemplary registration request having a Mobile Node ID extension that may be sent by a mobile node in accordance with the third embodiment of the invention. In addition to the fields described with reference to FIG. 3, corresponding to the first and second embodiments, a registration request packet 1502 may further include a mobile node ID extension 1504 in which the mobile node ID 1506 is provided. Moreover, as described above, an extension bit may be provided in one of the reserved bits 356 to indicate that the mobile node ID 1506 is provided in the mobile node ID extension 1504.

Figure 16A:
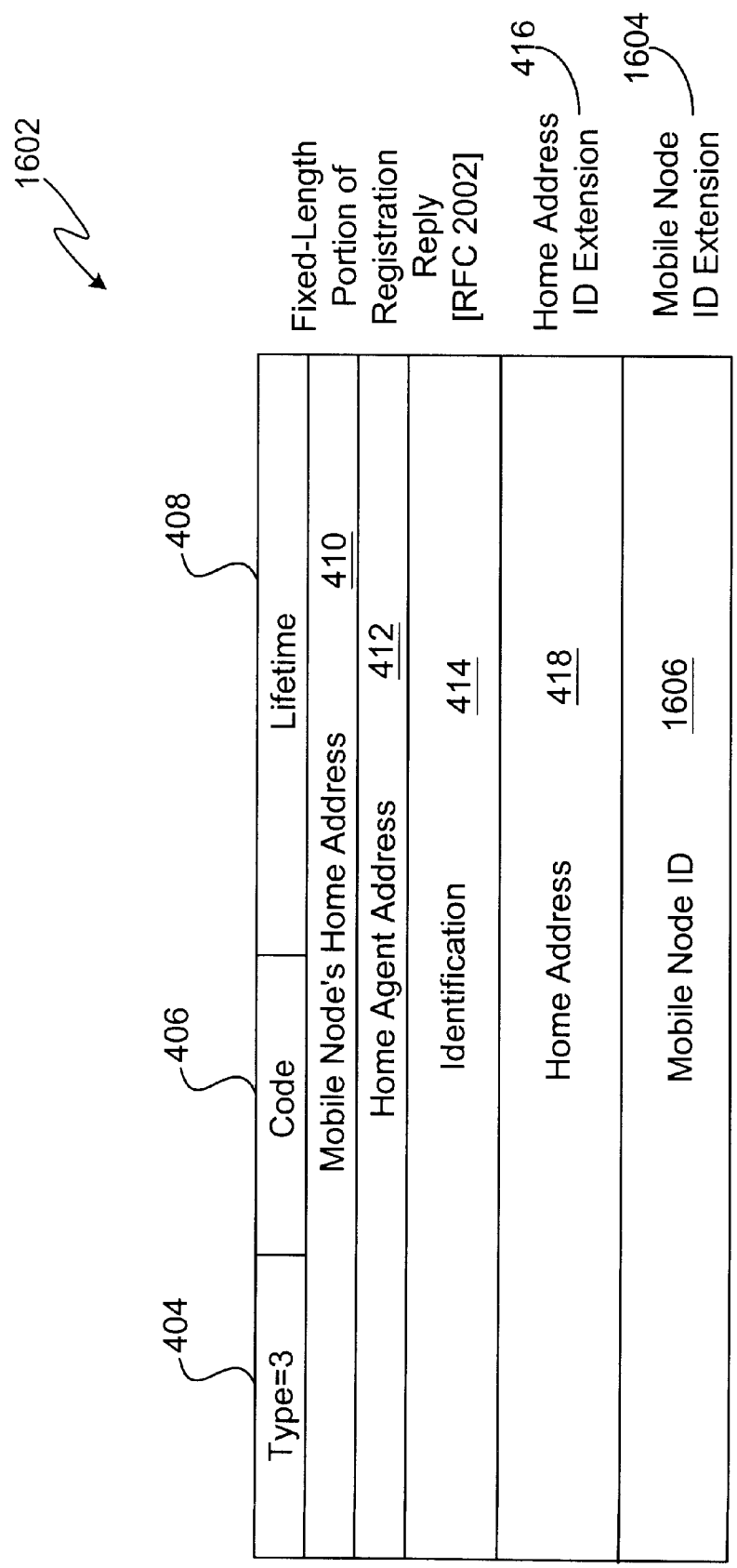
FIG. 16A is an exemplary registration reply having a Home Address extension and a Mobile Node ID extension that may be sent by the Home Agent in accordance with the third embodiment of the invention.

As described above with reference to the first and second embodiments, the registration reply may include a Home Address ID extension in which the assigned IP address is provided and transferred to the mobile node. In accordance with the third embodiment, since the mobile node ID cannot fit within the Home Address field 410 of the registration reply, a second extension to the registration reply is provided. FIG. 16A is an exemplary registration reply having a Home Address extension, as shown in FIG. 4, and a Mobile Node ID extension that may be sent by the Home Agent in accordance with the third embodiment of the invention. As shown, the registration reply packet 1602 according to the third embodiment includes a Mobile Node ID extension 1604 in which the mobile node ID 1606 is provided and transferred from the Home Agent to the mobile node (either directly or via a Foreign Agent).

Figure 16B:
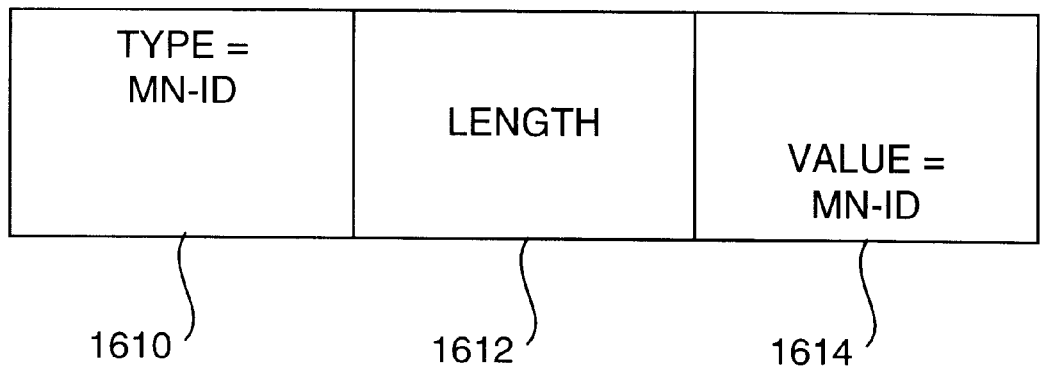
FIG. 16B illustrates exemplary extensions that may be provided in registration request and registration reply packets in accordance with an embodiment of the invention.
Figure 16B:
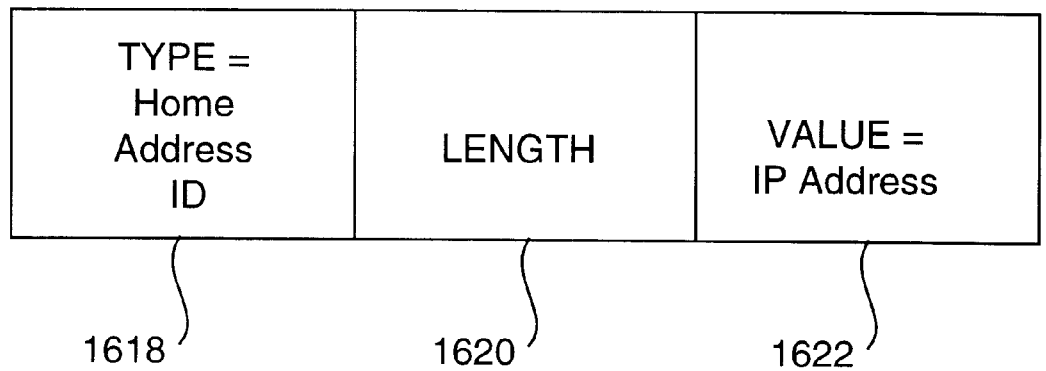

FIG. 16B illustrates exemplary extensions that may be provided in registration request and registration reply packets in accordance with an embodiment of the invention. As described above, a mobile node ID extension 1608 may be provided in the registration request and the registration reply packets. The mobile node ID extension 1608 may include the type of the extension 1610 (e.g., mobile node ID), the length or size of the extension 1612 (e.g., in bytes), and a value field 1614 containing the mobile node ID in a string or other format.

Similarly, a Home Address ID extension 1616 may be provided in the registration reply packet as described above. The Home Address ID extension 1616 may include the type of the extension 1618 (e.g., Home Address ID), the length or size of the extension 1620 (e.g., in bytes), and a value field 1622 containing the IP address in a string or other format.

Once the registration phase has been completed, the mobile node may use the assigned IP address in its communication with corresponding nodes. These corresponding nodes may then send packets to this assigned IP address. The Home Agent then forwards these packets to the appropriate Foreign Agent using its mobility binding table. Since the Foreign Agent has access to the IP address in its visitor table, these packets may be forwarded to the mobile node associated with the assigned IP address. The IP address may be de-allocated at a later time to permit the IP address to be reassigned to another mobile node. Thus, as the mobile node roams from foreign agent to foreign agent, the mobile node may keep its IP address from the first registration until it is de-allocated. This permits corresponding nodes to continue using the same IP address to communicate with the mobile node during a given session.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and signals embodied on a carrier wave.

The apparatus (Home Agent, Foreign Agent, and/or mobile node) of this invention may be specially constructed for the required purposes, or may be a general purpose programmable machine selectively activated or reconfigured by a computer program stored in memory. The processes presented herein are not inherently related to any particular router or other apparatus. In a preferred embodiment, any of the Home and Foreign Agents and mobile nodes of this invention may be specially configured routers such as specially configured router models 2500, 2600, 3600, 4000, 4500, 4700, 7200, and 7500 available from Cisco Systems, Inc. of San Jose, Calif. A general structure for some of these machines will appear from the description given below.

Figure 17:
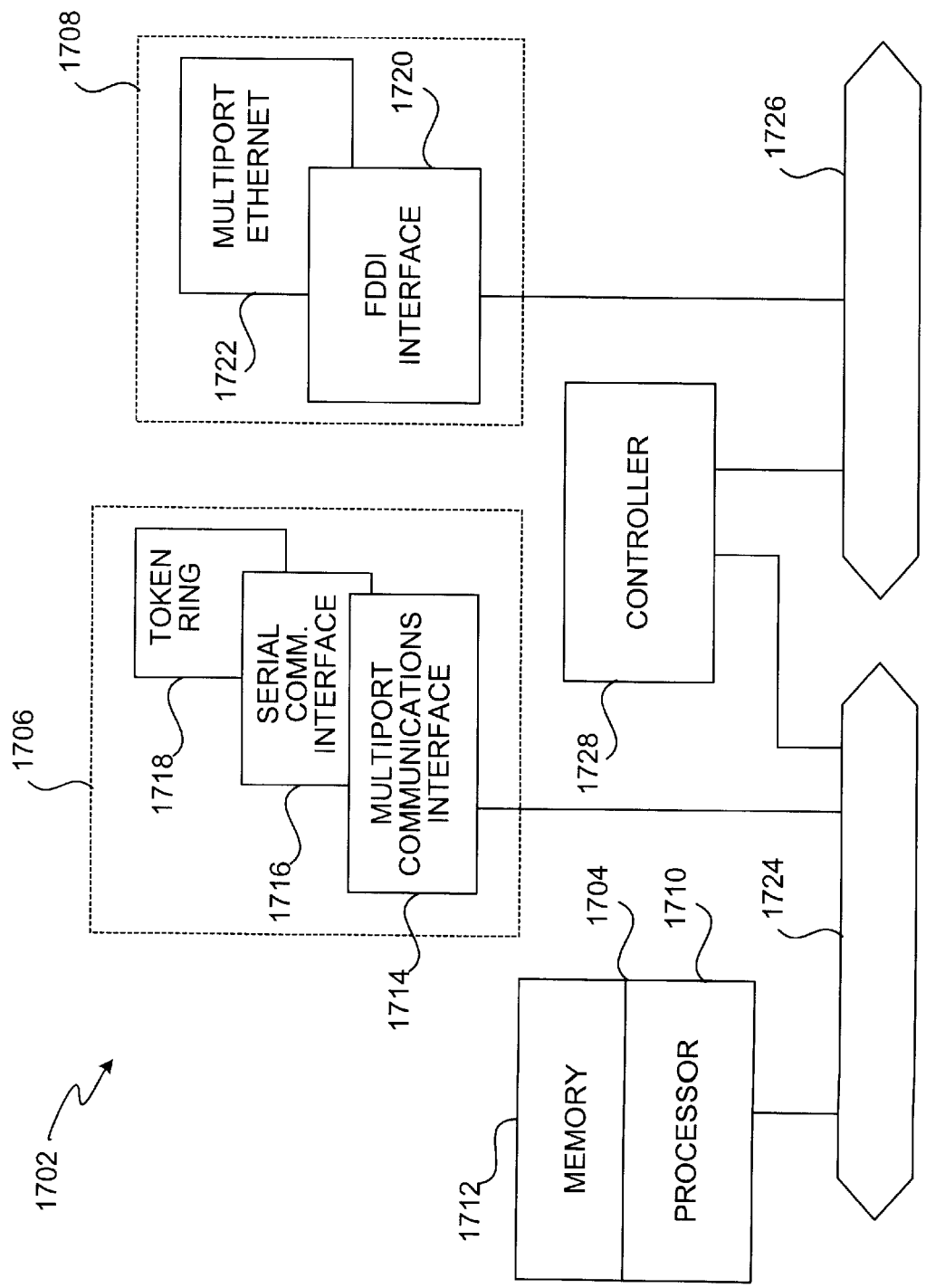
FIG. 17 is a block diagram of a network device that may be configured to implement aspects of the present invention.

Referring now to FIG. 17, a router/agent 1702 of the present invention includes a master central processing unit (CPU) 1704, low and medium speed interfaces 1706, and high speed interfaces 1708. When acting under the control of appropriate software or firmware, the CPU 1704 is responsible for such router tasks as routing table computations and network management. It is also responsible for registration, packet tunneling and other Mobile IP functions of a Home Agent or a Foreign Agent. It may include one or more microprocessor chips 1710 selected from complex instruction set computer (CISC) chips (such as the Motorola MPC860 microprocessor or the Motorola 68030 microprocessor, reduced instruction set computer (RISC) chips, or other available chips. In a preferred embodiment, a memory 1712 (such as non-volatile RAM and/or ROM) also forms part of CPU 1704. However, there are many different ways in which memory could be coupled to the system.

The interfaces 1708 and 1706 are typically provided as interface cards. Generally, they control the sending and receipt of data packets over the network and sometimes support other peripherals used with the router 1702. The low and medium speed interfaces 1706 include a multiport communications interface 1714, a serial communications interface 1716, and a token ring interface 1718. The high speed interfaces 1708 include an FDDI interface 1720 and a multiport ethernet interface 1722. Preferably, each of these interfaces (low/medium and high speed) includes (1) a plurality of ports appropriate for communication with the appropriate media, and (2) an independent processor such as the 2901 bit slice processor (available from Advanced Micro Devices corporation of Santa Clara Calif.), and in some instances (3) volatile RAM. The independent processors control such communications intensive tasks as packet switching and filtering, and media control and management. By providing separate processors for the communications intensive tasks, this architecture permits the master microprocessor 1704 to efficiently perform routing computations, network diagnostics, security functions, etc.

The low and medium speed interfaces are coupled to the master CPU 1704 through a data, control, and address bus 1724. High speed interfaces 1708 are connected to the bus 1724 through a fast data, control, and address bus 1726 which is in turn connected to a bus controller 1728. The bus controller functions are provided by a processor such as a 2901 bit slice processor.

Although the system shown in FIG. 17 is a preferred router of the present invention, it is by no means the only router architecture on which the present invention can be implemented. For example, an architecture having a single processor that handles communications as well as routing computations, etc. would also be acceptable. Further, other types of interfaces and media could also be used with the router. Still further, in some cases, the invention can be implemented on network devices other than routers.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described routers, other entities used to tunnel packets to mobile nodes on remote network segments can be used as well. For example, bridges or other less intelligent packet switches may also employ the standby protocol of this invention. Accordingly, the present embodiments are to be considered as illustrative and not restrictive, and the invention is not to be limited to the details given herein, but may be modified within the scope and equivalents of the appended claims.

What is claimed is:

1. In a mobile node having a mobile node ID, a method of sending a registration request, comprising:

composing a registration request packet;

storing at least a portion of the mobile node ID in the registration request packet;

indicating in the registration request packet whether the mobile node has an IP address; and sending the registration request packet to a Home Agent associated with the mobile node;

wherein the registration request packet has a home address field, and wherein storing the mobile node ID includes storing a portion of the mobile node ID in the home address field of the registration request packet;

wherein the mobile node ID contains a number of bytes greater than that of the home address field.

2. In a mobile node having a mobile node ID, a method of sending a registration request, comprising:

composing a registration request packet;

storing at least a portion of the mobile node ID in the registration request packet;

indicating in the registration request packet whether the mobile node has an IP address; and sending the registration request packet to a Home Agent associated with the mobile node;

wherein the registration request packet has a home address field, and wherein storing the mobile node ID includes storing the mobile node ID in the home address field of the registration request packet;

wherein the mobile node ID contains a number of bytes less than or equal to that of the home address field.

3. In a mobile node having a mobile node ID, a method of sending a registration request, comprising:

composing a registration request packet;

storing at least a portion of the mobile node ID in the registration request packet;

indicating in the registration request packet whether the mobile node has an IP address; and sending the registration request packet to a Home Agent associated with the mobile node;

wherein the registration request packet has a mobile node ID extension, and wherein storing the mobile node ID includes storing the mobile node ID in the mobile node ID extension of the registration request packet.

4. The method as recited in claim 3, the registration request packet further including an extension bit and a home address field, wherein storing the mobile node ID further comprises:

storing the mobile node ID in the mobile node ID extension when the mobile node ID has a number of bytes greater than that of the home address field; and setting the extension bit in a full state when the number of bytes in the mobile node ID is greater than that of the home address field, and otherwise in an empty state.

5. In a Home Agent, a method of processing a registration request packet received from a mobile node, comprising:

receiving the registration request packet from a mobile node;

ascertaining whether the mobile node designated by the registration request packet needs an IP address;

assigning an IP address to the mobile node if it is ascertained that the mobile node needs an IP address; and composing a registration reply specifying the IP address assigned to the mobile node;

wherein the registration request packet specifies at least a portion of a mobile node ID associated with the mobile node;

wherein the registration request packet further includes a mobile node ID extension, the at least a portion of the mobile node ID being provided in the mobile node ID extension of the registration request packet.

6. The method as recited in claim 5, further comprising authenticating the mobile node using the mobile node ID provided in the mobile node ID extension.

7. In a Foreign Agent, a method of processing a registration reply packet received from a Home Agent, comprising:

receiving the registration reply packet, the registration reply packet specifying at least a portion of a mobile node ID and an IP address associated with a mobile node;

obtaining the portion of the mobile node ID and the IP address from the registration reply packet;

updating a visitor table with a mapping of the mobile node ID to the IP address associated with the mobile node; and sending the registration reply packet to the mobile node, wherein the registration reply packet includes a Home Address field, the portion of the mobile node ID being provided in the Home Address field of the registration reply packet, wherein the mobile node ID contains a number of bytes greater than that of the Home Address field.

8. The method as recited in claim 7, wherein the registration reply packet comprises a Home Address ID extension, the IP address being provided in the Home Address ID extension.

9. In a Foreign Agent, a method of processing a registration reply packet received from a Home Agent, comprising:

receiving the registration reply packet, the registration reply packet specifying at least a portion of a mobile node ID and an IP address associated with a mobile node;

obtaining the portion of the mobile node ID and the IP address from the registration reply packet;

updating a visitor table with a mapping of the mobile node ID to the IP address associated with the mobile node; and sending the registration reply packet to the mobile node;

wherein the registration reply packet includes a Mobile Node ID extension, the portion of the mobile node ID being provided in the Mobile Node ID extension of the registration reply packet.

10. A computer-readable medium storing thereon computer-readable instructions for processing a registration request packet received from a mobile node in a Home Agent, comprising:

instructions for receiving the registration request packet from a mobile node;

instructions for ascertaining whether the mobile node designated by the registration request packet needs an IP address.

11. In a Home Agent, a method of processing a registration request packet received from a mobile node, comprising:

receiving the registration request packet from a mobile node;

ascertaining whether the mobile node designated by the registration request packet needs an IP address;

assigning an IP address to the mobile node if it is ascertained that the mobile node needs an IP address; and composing a registration reply specifying the IP address assigned to the mobile node, wherein the registration reply includes a Home Address field and the mobile node has a mobile node ID, wherein composing the registration reply includes storing a portion of the mobile node ID in the Home Address field of the registration reply, wherein the mobile node ID contains a number of bytes greater than that of the Home Address field.

12. In a Home Agent, a method of processing a registration request packet received from a mobile node, comprising:

receiving the registration request packet from a mobile node;

ascertaining whether the mobile node designated by the registration request packet needs an IP address;

assigning an IP address to the mobile node if it is ascertained that the mobile node needs an IP address; and composing a registration reply specifying the IP address assigned to the mobile node;

wherein composing the registration reply includes appending an IP address extension to the registration reply, the IP address extension including the IP address assigned to the mobile node.

13. The method as recited in claim 12, wherein composing the registration reply further comprises appending a mobile node ID extension to the registration reply, the mobile node ID extension including a mobile node ID associated with the mobile node.

14. The method as recited in claim 13, wherein the registration request packet includes a mobile node ID extension including the mobile node ID, wherein composing the registration reply further comprises obtaining the mobile node ID from the mobile node ID extension of the registration request packet.

15. The method as recited in claim 14, wherein the registration request packet further includes an extension bit, the extension bit indicating that the mobile node ID is provided in the mobile node ID extension when in a first state, and indicating that the mobile node ID is provided in a Home Address field of the registration request packet when in a second state, wherein obtaining the mobile node ID from the mobile node ID extension is performed when the extension bit is in the first state.

16. The method as recited in claim 12, wherein the registration request packet includes an ID indicator, the ID indicator indicating that the mobile node has an IP address when the ID indicator is in a first state, and otherwise indicating that the mobile node does not have an IP address, wherein ascertaining comprises determining whether the ID indicator is in the first state.

17. The method as recited in claim 16, wherein the ID indicator is a reserved bit of the registration request packet.

18. The method as recited in claim 12, wherein ascertaining comprises determining from a mobile host table whether the mobile node has an IP address, the mobile host table having a list of mobile nodes that the Home Agent supports, the list of mobile nodes being associated with corresponding IP addresses.

19. The method as recited in claim 12, wherein assigning the IP address to the mobile node comprises obtaining the IP address associated with the mobile node from a mobility binding table, the mobility binding table having a list that maps mobile nodes that have registered with the Home Agent with corresponding IP addresses and care-of addresses.

20. The method as recited in claim 12, wherein assigning the IP address to the mobile node comprises obtaining an IP address from an address pool associated with the Home Agent.

21. The method as recited in claim 20, further comprising de-allocating the IP address such that the IP address is provided in the address pool associated with the Home Agent.

22. The method as recited in claim 12, wherein the registration request packet specifies at least a portion of a mobile node ID associated with the mobile node.

23. The method as recited in claim 22, further comprising updating a mobility binding table to associate the IP address assigned to the mobile node with the mobile node ID.

24. The method as recited in claim 22, wherein the registration request packet further comprises a Home Address field, the portion of the mobile node ID being provided in the Home Address field of the registration request packet.

25. The method as recited in claim 24, further comprising authenticating the mobile node using the Home Address field of the registration request packet.

26. The method as recited in claim 13, wherein the registration request packet further includes an extension bit, the extension bit indicating that the mobile node ID is provided in a mobile node ID extension of the registration request packet when in a first state, and indicating that the mobile node ID is provided in a Home Address field of the registration request packet when in a second state, wherein obtaining the mobile node ID from the mobile node ID extension is performed when the extension bit is in the first state, the method further comprising:

obtaining the mobile node ID from an extension to the registration request packet when the extension bit is in the first state; and obtaining the mobile node ID from the Home Address field of the registration request packet when the extension bit is in the second state.

27. A computer-readable medium storing thereon computer-readable instructions for processing a registration request packet received from a mobile node in a Home Agent, comprising:

instructions for receiving the registration request packet from a mobile node, wherein the registration request packet includes a mobile node ID extension, the mobile node ID extension specifying at least a portion of a mobile node ID associated with the mobile node;

instructions for ascertaining whether the mobile node designated by the registration request packet needs an IP address;

instructions for assigning an IP address to the mobile node if it is ascertained that the mobile node needs an IP address; and instructions for composing a registration reply specifying the IP address assigned to the mobile node.

28. A computer-readable medium storing thereon computer-readable instructions for processing a registration reply packet received from a Home Agent in a Foreign Agent, comprising:

instructions for receiving the registration reply packet, the registration reply packet specifying at least a portion of a mobile node ID and an IP address associated with a mobile node, wherein the registration reply packet includes a Mobile Node ID extension, the portion of the mobile node ID being provided in the Mobile Node ID extension of the registration reply packet;

instructions for obtaining the portion of the mobile node ID and the IP address from the registration reply packet;

instructions for updating a visitor table with a mapping of the mobile node ID to the IP address associated with the mobile node; and instructions for sending the registration reply packet to the mobile node.

29. In a Home Agent, a method of processing a registration request packet received from a mobile node, comprising:

receiving the registration request packet from a mobile node, wherein the registration request packet specifies at least a portion of a mobile node ID associated with the mobile node and wherein the registration request packet has a home address field, and wherein the at least a portion of the mobile node ID is specified in the home address field of the registration request packet, wherein the mobile node ID contains a number of bytes greater than that of the home address field, ascertaining whether the mobile node designated by the at least a portion of a mobile node ID needs an IP address;

assigning an IP address to the mobile node if it is ascertained that the mobile node needs an IP address; and composing a registration reply specifying the IP address assigned to the mobile node.

30. The method as recited in claim 29, further comprising authenticating the mobile node using the at least a portion of the mobile node ID provided in the home address field of the registration request packet.

31. A computer-readable medium storing thereon computer-readable instructions for processing a registration request packet received from a mobile node in a Home Agent, comprising:

instructions for receiving the registration request packet from a mobile node, wherein the registration request packet specifies at least a portion of a mobile node ID associated with the mobile node, wherein the registration request packet has a home address field, and wherein the at least a portion of the mobile node ID is specified in the home address field of the registration request packet, wherein the mobile node ID contains a number of bytes greater than that of the home address field;

instructions for ascertaining whether the mobile node designated by the at least a portion of a mobile node ID needs an IP address;

instructions for assigning an IP address to the mobile node if it is ascertained that the mobile node needs an IP address; and instructions for composing a registration reply specifying the IP address assigned to the mobile node.

32. The computer-readable medium as recited in claim 31, further comprising instructions for authenticating the mobile node using the at least a portion of the mobile node ID provided in the home address field of the registration request packet.

33. In a Home Agent, a method of processing a registration request packet received from a mobile node, comprising:

receiving the registration request packet from a mobile node, wherein the registration request packet specifies a mobile node ID associated with the mobile node and wherein the registration request packet has a home address field, and wherein the mobile node ID is specified in the home address field of the registration request packet, wherein the mobile node ID contains a number of bytes less than or equal to that of the home address field; ascertaining whether the mobile node designated by the at least a portion of a mobile node ID needs an IP address;

assigning an IP address to the mobile node if it is ascertained that the mobile node needs an IP address; and composing a registration reply specifying the IP address assigned to the mobile node.

34. The method as recited in claim 33, further comprising authenticating the mobile node using the mobile node ID provided in the home address field of the registration request packet.

35. A computer-readable medium storing thereon computer-readable instructions for processing a registration request packet received from a mobile node in a Home Agent, comprising:

instructions for receiving the registration request packet from a mobile node, wherein the registration request packet specifies a mobile node ID associated with the mobile node and wherein the registration request packet has a home address field, and wherein the mobile node ID is specified in the home address field of the registration request packet, wherein the mobile node ID contains a number of bytes less than or equal to that of the home address field;

instructions for ascertaining whether the mobile node designated by the at least a portion of a mobile node ID needs an IP address;

instructions for assigning an IP address to the mobile node if it is ascertained that the mobile node needs an IP address; and instructions for composing a registration reply specifying the IP address assigned to the mobile node.

36. The computer-readable medium as recited in claim 35, further comprising instructions for authenticating the mobile node using the mobile node ID provided in the home address field of the registration request packet.

37. A Home Agent adapted for processing a registration request packet received from a mobile node, comprising:

means for receiving the registration request packet from a mobile node;

means for ascertaining whether the mobile node designated by the registration request packet needs an IP address;

means for assigning an IP address to the mobile node if it is ascertained that the mobile node needs an IP address; and means for composing a registration reply specifying the IP address assigned to the mobile node;

wherein the means for composing the registration reply comprises means for appending an IP address extension to the registration reply, the IP address extension including the IP address assigned to the mobile node.

38. A Home Agent adapted for processing a registration request packet received from a mobile node, comprising:

a processor; and a memory, at least one of the processor and the memory being adapted for:

receiving the registration request packet from a mobile node;

ascertaining whether the mobile node designated by the registration request packet needs an IP address;

assigning an IP address to the mobile node if it is ascertained that the mobile node needs an IP address; and composing a registration reply specifying the IP address assigned to the mobile node;

wherein composing the registration reply comprises appending an IP address extension to the registration reply, the IP address extension including the IP address assigned to the mobile node.

39. A Home Agent adapted for processing a registration request packet received from a mobile node comprising:

means for receiving the registration request packet from a mobile node, wherein the registration request packet specifies at least a portion of a mobile node ID associated with the mobile node and wherein the registration request packet has a home address field, and wherein the at least a portion of the mobile node ID is specified in the home address field of the registration request packet, wherein the mobile node ID contains a number of bytes greater than that of the home address field;

means for ascertaining whether the mobile node designated by the at least a portion of a mobile node ID needs an IP address;

means for assigning an IP address to the mobile node if it is ascertained that the mobile node needs an IP address; and means for composing a registration reply specifying the IP address assigned to the mobile node.

40. A Home Agent adapted for processing a region request packet received from a mobile node, comprising:

a processor, and a memory, at least one of the processor and the memory being adapted for:

receiving the registration request packet from a mobile node, wherein the registration request packet specifies at least a portion of a mobile node ID associated with the mobile node and wherein registration request packet has a home address field, and wherein the at least a portion of the mobile node ID is specified in the home address field of the registration request packet, who the mobile node ID contains a number of bytes greater than tat of the home address field;

ascertaining whet the mobile node designated by the at least a portion of a mobile node ID needs an IP address;

assigning an IP address to the mobile node if it is as ed that the mobile node needs an IP adds; and composing a registration reply specifying the IP address assigned to the mobile node.

41. A computer-readable medium storing thereon computer-readable instructions for processing a registration request packet received from a mobile node, comprising:
   instructions for receiving the registration request packet from a mobile node;
   instructions for ascertaining whether the mobile node designated by the registration request packet needs an IP address;
   instructions for assigning an IP address to the mobile node if it is ascertained that the mobile node needs an IP address; and
   instructions for composing a registration reply specifying the IP address assigned to the mobile node, wherein the registration reply includes a Home Address field and the mobile node has a mobile node ID, wherein composing the registration reply includes
      instructions for storing a portion of the mobile node ID in the Home Address field of the registration reply, wherein the mobile node ID contains a number of bytes greater than that of the Home Address field.

42. A Home Agent adapted for processing a registration request packet received from a mobile node, comprising:
   a processor; and
   a memory, at least one of the processor and the memory being adapted for:
   receiving the registration request packet from a mobile node;
   ascertaining whether the mobile node designated by the registration request packet needs an IP address;
   assigning an IP address to the mobile node if it is ascertained that the mobile node needs an IP address; and
   composing a registration reply specifying the IP address assigned to the mobile node, wherein the registration reply includes a Home Address field and the mobile node has a mobile node ID, wherein composing the registration reply includes storing a portion of the mobile node ID in the Home Address field of the registration reply, wherein the mobile node ID contains a number of bytes greater than that of the Home Address field.

43. A Home Agent adapted for processing a registration request packet received from a mobile node, comprising:
   means for receiving the registration request packet from a mobile node;
   means for ascertaining whether the mobile node designated by the registration request packet needs an IP address;
   means for assigning an IP address to the mobile node if it is ascertained that the mobile node needs an IP address; and
   means for composing a registration reply specifying the IP address assigned to the mobile node, wherein the registration reply includes a Home Address field and the mobile node has a mobile node ID, wherein composing the registration reply includes means for storing a portion of the mobile node ID in the Home Address field of the registration reply, wherein the mobile node ID contains a number of bytes greater than that of the Home Address field.

44. A computer-readable medium storing thereon computer-readable instructions for processing a registration reply packet received from a Home Agent, comprising:
   instructions for receiving the registration reply packet, the registration reply packet specifying at least a portion of a mobile node ID and an IP address associated with a mobile node;
   instructions for obtaining the portion of the mobile node ID and the IP address from the registration reply packet;
   instructions for updating a visitor table with a mapping of the mobile node ID to the IP address associated with the mobile node; and
   instructions for sending the registration reply packet to the mobile node, wherein the registration reply packet includes a Home Address field, the portion of the mobile node ID being provided in the Home Address field of the registration reply packet, wherein the mobile node ID contains a number of bytes greater than that of the Home Address field.

45. A Foreign Agent adapted for processing a registration reply packet received from a Home Agent, comprising:
   a processor; and
   a memory, at least one of the processor and the memory being adapted for:
   receiving the registration reply packet, the registration reply packet specifying at least a portion of a mobile node ID and an IP address associated with a mobile node;
   obtaining the portion of the mobile node ID and the IP address from the registration reply packet;
   updating a visitor table with a mapping of the mobile node ID to the IP address associated with the mobile node; and
   sending the registration reply packet to the mobile node, wherein the registration reply packet includes a Home Address field, the portion of the mobile node ID being provided in the Home Address field of the registration reply packet, wherein the mobile node ID contains a number of bytes greater than that of the Home Address field.

46. A Foreign Agent adapted for processing a registration reply packet received from a Home Agent, comprising:
   means for receiving the registration reply packet, the registration reply packet specifying at least a portion of a mobile node ID and an IP address associated with a mobile node;
   means for obtaining the portion of the mobile node ID and the IP address from the registration reply packet;
   means for updating a visitor table with a mapping of the mobile node ID to the IP address associated with the mobile node; and
   means for sending the registration reply packet to the mobile node, wherein the registration reply packet includes a Home Address field, the portion of the mobile node ID being provided in the Home Address field of the registration reply packet, wherein the mobile node ID contains a number of bytes greater than that of the Home Address field.

* * * * *